United States Patent
Liu et al.

(10) Patent No.: US 11,797,098 B2
(45) Date of Patent: Oct. 24, 2023

(54) METHODS FOR RECOGNIZING HUMAN HAND AND HAND GESTURE FROM HUMAN, AND DISPLAY APPARATUS

(71) Applicant: BOE TECHNOLOGY GROUP CO., LTD., Beijing (CN)

(72) Inventors: Cheng Liu, Beijing (CN); Sijia Guo, Beijing (CN); Guanchu Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/790,416

(22) PCT Filed: May 17, 2021

(86) PCT No.: PCT/CN2021/094191
§ 371 (c)(1),
(2) Date: Jun. 30, 2022

(87) PCT Pub. No.: WO2021/238710
PCT Pub. Date: Dec. 2, 2021

(65) Prior Publication Data
US 2023/0037445 A1 Feb. 9, 2023

(30) Foreign Application Priority Data

May 26, 2020 (CN) .......................... 202010455620.X

(51) Int. Cl.
*G06F 3/01* (2006.01)
*G01S 7/41* (2006.01)

(52) U.S. Cl.
CPC .............. *G06F 3/017* (2013.01); *G01S 7/415* (2013.01)

(58) Field of Classification Search
CPC .......... G06F 3/017; G01S 7/415; G01S 13/89; G01S 7/41; G01S 13/88; G06V 40/23; G06V 40/28
See application file for complete search history.

(56) References Cited

U.S. PATENT DOCUMENTS

| | | | |
|---|---|---|---|
| 10,540,001 B1 * | 1/2020 | Poupyrev | G01S 7/415 |
| 10,832,418 B1 * | 11/2020 | Karasev | G06V 10/42 |

(Continued)

FOREIGN PATENT DOCUMENTS

| | | |
|---|---|---|
| CN | 102509088 A | 6/2012 |
| CN | 103699220 A | 4/2014 |

(Continued)

OTHER PUBLICATIONS

First Office Action for the Chinese Patent Application No. 202010455620.X issued by the Chinese Patent Office dated Jul. 11, 2022.

*Primary Examiner* — Grant Sitta
(74) *Attorney, Agent, or Firm* — IP & T GROUP LLP

(57) ABSTRACT

A method for recognizing a human hand comprises: recognizing a human body target by using a plurality of frames of detection information acquired by a millimeter wave radar within a preset time period; determining whether a new detection target satisfying setting conditions exists within a preset range centering on the human body target, according to a current frame of detection information, the setting (Continued)

conditions including: having a radial velocity; if so, determining the new detection target satisfying the setting conditions as a hand corresponding to the human body target; and if not, determining that the hand corresponding to the human body target does not exist in the current frame.

19 Claims, 9 Drawing Sheets

(56) References Cited

U.S. PATENT DOCUMENTS

| | | | |
|---|---|---|---|
| 11,099,258 B2* | 8/2021 | Buddendick | G01S 13/343 |
| 2011/0181509 A1 | 7/2011 | Rautiainen et al. | |
| 2016/0320853 A1* | 11/2016 | Lien | G01S 13/66 |
| 2018/0157330 A1 | 6/2018 | Gu et al. | |
| 2018/0373340 A1 | 12/2018 | Cheng et al. | |
| 2019/0049558 A1 | 2/2019 | Yung et al. | |
| 2019/0317191 A1 | 10/2019 | Santra et al. | |
| 2019/0383927 A1 | 12/2019 | Mihajlovic et al. | |
| 2019/0392205 A1 | 12/2019 | Tang et al. | |
| 2020/0143656 A1* | 5/2020 | Li | G08B 21/043 |
| 2020/0201536 A1 | 6/2020 | Han et al. | |
| 2020/0356178 A1* | 11/2020 | Qiu | G01S 13/88 |
| 2020/0387230 A1 | 12/2020 | Zhao et al. | |
| 2021/0080557 A1* | 3/2021 | Vaishnav | G01S 13/723 |
| 2021/0232228 A1* | 7/2021 | Nguyen | A61B 5/1123 |
| 2021/0232235 A1* | 7/2021 | Regani | G06F 3/03545 |
| 2021/0240274 A1* | 8/2021 | Schmalenberg | G01S 13/87 |
| 2021/0243260 A1* | 8/2021 | Bhaumik | H04W 4/38 |
| 2021/0325512 A1* | 10/2021 | Wang | G01S 7/417 |
| 2022/0091252 A1* | 3/2022 | Wang | G01C 21/165 |

FOREIGN PATENT DOCUMENTS

| | | |
|---|---|---|
| CN | 105607745 A | 5/2016 |
| CN | 107132913 A | 9/2017 |
| CN | 107961035 A | 4/2018 |
| CN | 108200706 A | 6/2018 |
| CN | 108344995 A | 7/2018 |
| CN | 108509910 A | 9/2018 |
| CN | 108596092 A | 9/2018 |
| CN | 108604733 A | 9/2018 |
| CN | 109151202 A | 1/2019 |
| CN | 109164915 A | 1/2019 |
| CN | 109188414 A | 1/2019 |
| CN | 109583436 A | 4/2019 |
| CN | 109643372 A | 4/2019 |
| CN | 109697394 A | 4/2019 |
| CN | 109712166 A | 5/2019 |
| CN | 110035304 A | 7/2019 |
| CN | 110045370 A | 7/2019 |
| CN | 110118966 A | 8/2019 |
| CN | 110290353 A | 9/2019 |
| CN | 110361725 A | 10/2019 |
| CN | 111104960 A | 5/2020 |
| CN | 111624572 A | 9/2020 |
| WO | 2015085874 A1 | 6/2015 |
| WO | 2019019900 A1 | 1/2019 |

* cited by examiner

METHODS FOR RECOGNIZING HUMAN HAND AND HAND GESTURE FROM HUMAN, AND DISPLAY APPARATUS

CROSS-REFERENCE TO RELATED APPLICATIONS

This application is a national phase entry under 35 USC 371 of International Patent Application No. PCT/CN2021/094191 filed on May 17, 2021, which claims priority to Chinese Patent Application No. 202010455620.X filed on May 26, 2020, which are incorporated herein by reference in their entirety.

TECHNICAL FIELD

The present disclosure relates to the field of radar detection technologies, for example, to methods for recognizing a human hand and a hand gesture from a human, and a display apparatus.

BACKGROUND

A millimeter wave radar refers to a radar with a working frequency band in a millimeter wave frequency band. Since a wavelength of a millimeter wave is between a wavelength of a centimeter wave and a wavelength of an optical wave, the millimeter wave combines advantages of microwave guidance and photoelectric guidance. The millimeter wave radar is a high-precision sensor detecting a relative distance, a relative speed, and an orientation of a detected object. With the development and progress of radar technology, millimeter wave radar sensors have begun to be used in automotive electronics, unmanned aerial vehicles, intelligent transportation and many other fields.

SUMMARY

In one aspect, a method for recognizing a human hand is provided. The method includes: recognizing a human body target by using a plurality of frames of detection information acquired by a millimeter wave radar within a preset time period; determining whether a new detection target satisfying setting conditions exists within a preset range centering on the human body target according to a current frame of detection information, the setting conditions including: having a radial velocity; if so, determining the new detection target satisfying the setting conditions as a hand corresponding to the human body target; and if not, determining that a hand corresponding to the human body target does not exist in the current frame.

In some embodiments, recognizing the human body target by using the plurality of frames of detection information acquired by the millimeter wave radar within the preset time period, includes: generating and maintaining a reference object map based on detection targets in the plurality frames of detection information; recognizing whether a target detected by the millimeter wave radar is a stationary object or a non-stationary object by using the reference object map; generating and maintaining a human body map based on non-stationary object(s) recognized by using the reference object map; and determining the human body target from the non-stationary object(s) in the plurality frames of detection information by using the human body map.

In some embodiments, generating and maintaining the reference object map based on the detection targets in the plurality frames of detection information, includes: generating and maintaining the reference object map based on parameters of the detection targets in the plurality frames of detection information. The parameters of each detection target includes: at least one of spatial coordinates, a radial velocity, a signal-to-noise ratio, a noise, a presence hot degree, a recent motion hot degree or a consecutive detection number.

In some embodiments, the presence hot degree is used to represent a frequency of a result that each detection target is detected in the plurality of frames of detection information, and the higher the frequency, the lager the presence hot degree; and/or the recent motion hot degree is used to represent a time interval between a last frame in which a motion of a detection target is detected and the current frame; the smaller the time interval, the larger a value of the recent motion hot degree; and/or the consecutive detection number is used to represent a number of times the detection target is continuously detected or continuously undetected; if the consecutive detection number is a positive value, it is indicated that the detection target is continuously detected; and if the consecutive detection number is a negative value, it is indicated that the detection target is continuously undetected.

In some embodiments, maintaining the reference object map, includes: extracting at least one detection target in each frame of detection information of the plurality frames of detection information one by one according to a detection sequence; calculating at least one spatial distance between each detection target in the frame of detection information and at least one existing target in the reference object map according to a spatial position of the detection target; if the at least one spatial distance is less than a first threshold, determining that the detection target and an existing target with a shortest spatial distance from the detection target are a same detected target, or determining that the detection target and the least one existing target in the reference object map are the same detected target; and if the at least one spatial distance is not less than the first threshold, creating a detected target in the reference object map for the detection target.

In some embodiments, after determining that the detection target and the existing target with the shortest spatial distance from the detection target are the same detected target, maintaining the reference object map further includes: updating parameters of the existing target, including: updating spatial coordinates to an average value of spatial coordinates of the detection target and spatial coordinates of the existing target; updating a radial velocity, a signal-to-noise ratio and a noise to values of respective parameters of the detection target; increasing a presence hot degree within another preset range based a gradient value; updating a recent motion hot degree to a maximum value of the recent motion hot degree if the radial velocity exists; updating a consecutive detection number within yet another preset range based on a detection state of a preceding frame; and if the consecutive detection number reaches a maximum value thereof, setting the presence hot degree to a maximum value thereof, and setting the recent motion hot degree to 0.

In some embodiments, after updating the parameters of the existing target, maintaining the reference object map further includes: if the presence hot degree of the existing target is greater than a preset value, and the recent motion hot degree is 0, marking the existing target as a stationary object; and/or, if the consecutive detection number of the existing target is equal to a preset minimum value, marking the existing target as a non-stationary object.

In some embodiments, after creating the detected target in the reference object map for the detection target, maintaining the reference object map further includes: determine parameters of the detected target that is created, wherein values of spatial coordinates, a radial velocity, a signal-to-noise ratio and a noise of the detected target are set to values of respective parameters of the detection target; a presence hot degree of the detected target is set to 1; a recent motion hot degree is set to a maximum value thereof if the radial velocity exists, otherwise, the recent motion hot degree is set to 0; and a consecutive detection number is set to 1.

In some embodiments, maintaining the reference object map, further includes: if a time point corresponding to the current frame is an end time point of an initialization process of the millimeter wave radar, updating parameters of all detected targets in the reference object map, including: decreasing a presence hot degree of each detected target within a preset range linearly; if a detected target corresponding to an existing target in the reference object map does not exist in the current frame, setting a consecutive detection number of the existing target to −1 if the consecutive detection number of the existing target is a positive value, and decreasing the consecutive detection number of the existing target by 1 if the consecutive detection number of the existing target is a negative value; and marking a detected target with a presence hot degree being greater than a preset value and a recent motion hot degree being 0 as a stationary object; marking a detected target with a continuous detection number reaching a preset minimum value as a non-stationary object; and deleting a detected target with a present hot degree being 0 from the reference object map. The initialization process is a process that starts from an appearance of a first frame to be detected after the millimeter wave radar is activated and ends at a preset time, so as to generate the reference object map.

In some embodiments, maintaining the human body map, includes: acquiring each detection target in a single frame of detection information of the plurality of frames of detection information; and if a detection target is marked as a non-stationary object in the reference object map, determining the detection target as the human body target; or, acquiring each detection target in the single frame of detection information of the plurality of frames of detection information; and if a detection target is marked as a non-stationary object in the reference object map, and one or more other detection targets marked as one or more non-stationary objects like the detection target exist within a designated range of the human body map, determining the detection target and the one or more other detection targets jointly as the human body target.

In some embodiments, after determining the human body target, maintaining the human body map further includes: determining whether a distance between a plane projection of the human body target on the human map and an existing target in the human body map is less than a second threshold; if so, merging the human body target with the existing target into a new human body target, and determining parameters of the new human body target in the human body map; and if not, creating the new human body target corresponding to the human body target in the human body map, and determining parameters of the new human body target according to parameters of the human body target.

In some embodiments, maintaining the human body map, further includes: comparing the human body target determined from the single frame of detection information with a human body target jointly determined from frames of detection information before the single frame of detection information; and if a distance between plane projections of the compared human body targets on the human body map is less than a third threshold, merging the compared human body targets, and updating parameters of a human body target obtained by merging in the human body map.

In some embodiments, the method further includes: if a plurality of new detection targets satisfy the setting conditions exist, determining a new detection target of the plurality of new detection targets corresponding to the hand corresponding to the human body target according to a distance between the millimeter wave radar and each new detection target satisfying the setting conditions.

In some embodiments, the setting conditions further includes: a signal-to-noise ratio less than a signal-to-noise ratio of the human body target.

In another aspect, a method for recognizing a hand gesture from the human is provided. The method for recognizing the human gesture from the human includes: determining spatial positions and radial velocities of a hand target in a plurality of consecutive frames based on the hand target corresponding to a human body target detected by a millimeter wave radar; determining a motion trajectory of the hand target according to the spatial positions and the radial velocities; performing a straight line fitting on the motion trajectory if the motion trajectory reaches a preset length; and determining the human gesture corresponding to the human body target according to a direction vector of a straight line obtained by fitting and the radial velocities.

In some embodiments, performing the straight line fitting, includes: performing a spatial straight line fitting; and/or projecting the motion trajectory into a preset plane, and performing the straight line fitting in the preset plane.

In some embodiments, determining the motion trajectory of the hand target according to the spatial positions and the radial velocities, includes: if the hand target is undetected in consecutive frames, determining whether a number of the consecutive frames in which the hand target is undetected is greater than a preset number; and if the number of the consecutive frames in which the hand target is undetected is greater than the preset number, stopping determining the motion trajectory of the hand target.

In still another aspect, a device for recognizing a human hand is provided. The device includes: a recognition unit, a judgment unit and a determination unit. The recognition unit is configured to recognize a human body target by using a plurality of frames of detection information acquired by a millimeter wave radar within a preset time period. The judgment unit is configured to determine whether a new detection target satisfying setting conditions exists within a preset range centered on the human body target recognized by the recognition unit according to a current frame of detection information. The setting conditions include: having a radial velocity. The determination unit is configured to, if the judgment unit determines that a new detection target satisfying the setting conditions exists, determine the new detection target as a hand of the human body target. The determination unit is further configured to, if the judgment unit determines that no new detection target satisfying the setting conditions exists, determining that the hand of the human body target does not exist in the current frame.

In still another aspect, a device for recognizing a hand gesture from a human is provided. The device includes a first determination unit, a second determination unit, a fitting unit and a gesture recognition unit. The first determination unit is configured to determine spatial positions and radial velocities of a hand target in a plurality of consecutive frames by using the hand target corresponding to a human body target detected by a millimeter wave radar. The second determination unit is configured to determine a motion trajectory of the hand target according to the spatial positions and the radial velocities that are determined by the first determination unit. The fitting unit is configured to perform a performing straight line fitting on the motion trajectory when the motion trajectory determined by the second determination unit reaches a preset length. The gesture recognition unit is configured to determine the hand gesture of the hand target according to a direction vector of a straight line fitted by the fitting unit and the radial velocities.

In still another aspect, a processor using for executing a program is provided. When the program is executed, any one of following methods is implemented: the method for recognizing the human hand as described in any one of the above embodiments, or the method for recognizing a hand gesture from the human, including: determining spatial positions and radial velocities of a hand target in a plurality of consecutive frames based on the hand target corresponding to the human body target detected by the millimeter wave radar; determining a motion trajectory of the hand target according to the spatial positions and the radial velocities; performing a straight line fitting on the motion trajectory if the motion trajectory reaches a preset length; and determining the human gesture corresponding to the human body target according to a direction vector of a straight line obtained by fitting and the radial velocities.

In still another aspect, a display apparatus is provided. The display apparatus includes: a display panel, a millimeter wave radar integrated in the display panel, and the processor as described in any one of the above embodiments. The millimeter wave radar is configured to acquiring a plurality of frames of detection information within a preset time period.

In still another aspect, a non-transitory computer-readable storage medium is provided. The computer-readable storage medium has stored computer program instructions that, when executed by a processor, cause the processor to perform any one of the following methods: the method for recognizing a human hand as described in any one of the above embodiments, or a method for recognizing a hand gesture from a human, including: determining spatial positions and radial velocities of a hand target in a plurality of consecutive frames based on the hand target corresponding to the human body target detected by the millimeter wave radar; determining a motion trajectory of the hand target according to the spatial positions and the radial velocities; performing a straight line fitting on the motion trajectory if the motion trajectory reaches a preset length; and determining the human gesture corresponding to the human body target according to a direction vector of a straight line obtained by fitting and the radial velocities.

In still another aspect, a computer program product is provided. The computer program product includes computer program instructions. When executed on a computer, the computer program instructions cause the computer to perform one or more of the methods for recognizing a human hand as described in any one of the above embodiments, or perform one or more steps in the method for recognizing the hand from the human gesture as described in any one of the above embodiments.

In still another aspect, a computer program is provided. When run on a computer, the computer program causes the computer to perform one or more of the methods for recognizing the human hand as described in any one of the above embodiments, or perform one or more steps in the method for recognizing hand gesture from the human as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person having ordinary skill in the art can obtain other drawings according to these accompanying drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
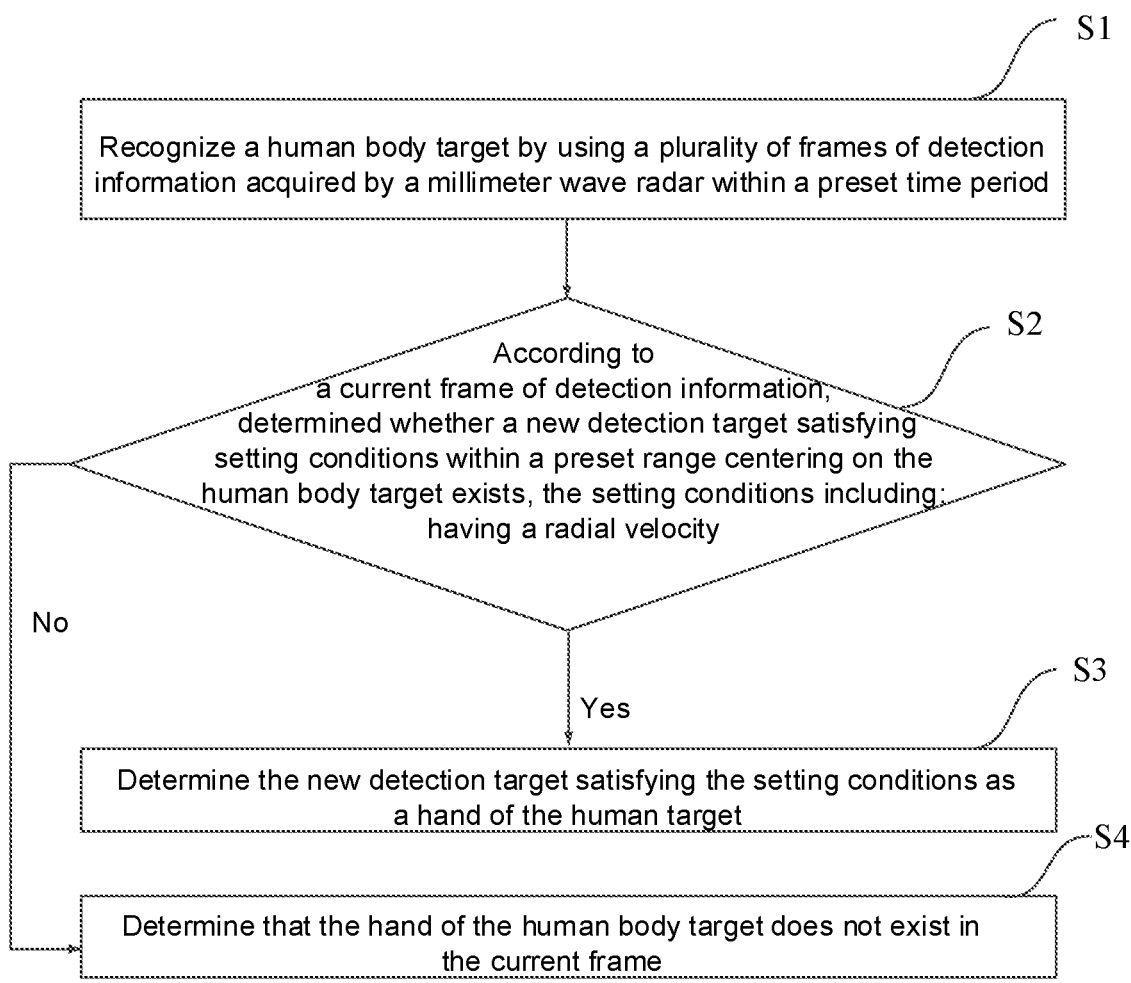
FIG. 1 is a flowchart of a method for recognizing a human hand, in accordance with some embodiments.

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, unless otherwise specified, the term "a plurality of/the plurality of" means two or more.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" used herein means an open and inclusive language, which does not exclude apparatuses that are applicable to or configured to perform additional tasks or steps.

In addition, the use of the phase "based on" means openness and inclusiveness, since a process, step, calculation or other action that is "based on" one or more of the stated conditions or values may, in practice, be based on additional conditions or values exceeding those stated.

A millimeter wave radar has certain advantages in detection for moving targets. For example, the millimeter wave radar may be used for detecting a human body or a hand. Either a human body target or a hand target is accurately recognized due to a motion thereof relative to the millimeter wave radar. However, when a human body and a hand corresponding to the human body are both moving, motions of the two will interfere with each other due to a relatively short distance therebetween. This makes it impossible to effectively distinguish the human body or the hand in motion, and thus fail to recognize a gesture from the hand.

Based on this, some embodiments of the present disclosure provide a method for recognizing a human hand. The method may recognize both a human body and a hand. As shown in FIG. 1, the method includes steps 1 (S1) to 4 (S4).

In S1, a human body target is recognized by using a plurality of frames of detection information acquired by a millimeter wave radar within a preset time period.

In this step, analysis is performed on the plurality of detection information acquired by the millimeter wave radar, and the human body target is determined by comparing detected targets in different frames. For example, in this step, a plurality of parameters need to be set for each detected target. The plurality of parameters includes conventional parameters and self-defined parameters. The conventional parameters are spatial coordinates, a radial velocity (i.e., a rate of change of a spatial distance between the detected target and the millimeter wave radar), a signal-to-noise ratio, a noise, etc. The self-defined parameters are mainly used to describe a motion state of the detected target in a plurality of consecutive frames, so as to assist in determining whether the detected target is a stationary object or a non-static object to determine whether the detected target is the human body target. It will be noted that non-stationary objects here include an object that moves within a detection range and an object that moves out of the detection range.

In S2, according to a current frame of detection information, it is determined whether a new detection target satisfying setting conditions within a preset range centering on the human body target exists, the setting conditions including: having a radial velocity.

In this step, the current frame of detection information is used as the analysis content, because a position of a same human body target may vary in the plurality of frames of detection information, which results in an inaccuracy of the preset range determined by centering on the human body target, and consequently, the new detection target may not be effectively determined.

It will be noted that the detected target detected by the millimeter wave radar is a target having spatial coordinates. In a case where a human hand is located between a human body and the millimeter wave radar, although the hand may block a part of the human body, the human body target may still be distinguished from a hand target through a position analysis of spatial coordinates.

The new detection target in this step is a target that appears near the human body target in the current frame and is detectable by the millimeter wave radar. The current frame in this step is a single frame of detection information in the plurality of frames of detection information in S1. The radial velocity in this step is used for representing a rate of change of a spatial distance between the new detection target and the millimeter wave radar.

In some examples, the setting conditions further include: a signal-to-noise ratio being less than a signal-to-noise ratio of the human body target.

In this way, in a case where it is determined a new detection target exists, in addition to recognizing whether the new detection target is a hand corresponding to the human body target according to whether the new detection target has a radial velocity (i.e., whether the new detection target is moving), the new detection target is further recognized according to whether a signal-to-noise ratio of the new detection target is less than the signal-to-noise ratio of the human body target, which makes a determination result accurate. This is because that, an equivalent reflection area of a human hand is small, and intensity of an echo signal of the human hand is low, while an equivalent reflection area of a human torso is large, and intensity of an echo signal of the human torso is high. On this basis, in a case where noise intensities are close, it appears that a signal-to-noise ratio of the human hand is less than the signal-to-noise ratio of the human body target (i.e., the human torso).

In a case where a new detection target that satisfies the setting conditions exists, the new detection target may be determined as a pending hand corresponding to the human body target, in this case, step 3 (S3) is executed; in a case where no new detection target that satisfies the setting conditions exists, step 4 (S4) is executed.

In S3, the new detection target satisfying the setting conditions is determined as the hand corresponding to the human body target.

After the hand corresponding to the human body target is recognized in this step, a further recognition may be performed on a hand gesture.

It will be noted that, if a new detection target does not satisfy the setting conditions, it may be determined that the new detection target is not the hand; alternatively, the new detection target is determined to be the hand, but does not make a gesture to be recognized. Here, no recognition is performed on such a new detection target.

For example, if it is determined that there exist a plurality of new detection targets satisfying the setting conditions, which new detection target as the hand corresponding to the human body is determined according to a distance between the millimeter wave radar and each new detection target satisfying the setting conditions.

For example, within a detection range of the millimeter wave radar, a new detection target that satisfies the setting conditions and is closest to the millimeter wave radar is determined as the hand corresponding to the human body target. It will be noted that, it is only a selection based on the above steps in general application scenarios to determine the new detection target that satisfies the setting conditions and is closest to the millimeter wave radar as the hand corresponding to the human body target. That is because, when recognition for the hand corresponding to the human body is preformed, the human body usually faces the millimeter wave radar, and the human stretches out his (her) hand forward and performs an action, in this case, the hand corresponding to the human body target is usually closest to the millimeter wave radar. If there exist some other application scenarios, in determining which new detection target is the hand corresponding to the human body target through distance, other basis such as a farthest distance may be used for making a determination.

In S4, it is determined that the hand corresponding to the human body target does not exist in the current frame.

As may be seen from the above implementations, in the method for recognizing the human hand based on the millimeter wave radar adopted by the embodiments of the present disclosure, the plurality of frames of detection information acquired by the millimeter wave radar within the preset time period are analyzed, and the self-defined parameters are used to assist in determining whether the human body target exists in the detected targets; and the new detection target(s) suspected to be the hand are analyzed based on the current frame of detection information, and if it is determined that the new detection target(s) exists, whether a new detection target is the hand corresponding to the human body is determined according to whether the new detection target satisfies the setting conditions. In this way, the human body and the corresponding hand that are within the detection range may be effectively recognized through the detection of the millimeter wave radar according to the above steps, which facilitates a sequent recognition for a gesture made by the hand.

Figure 2:
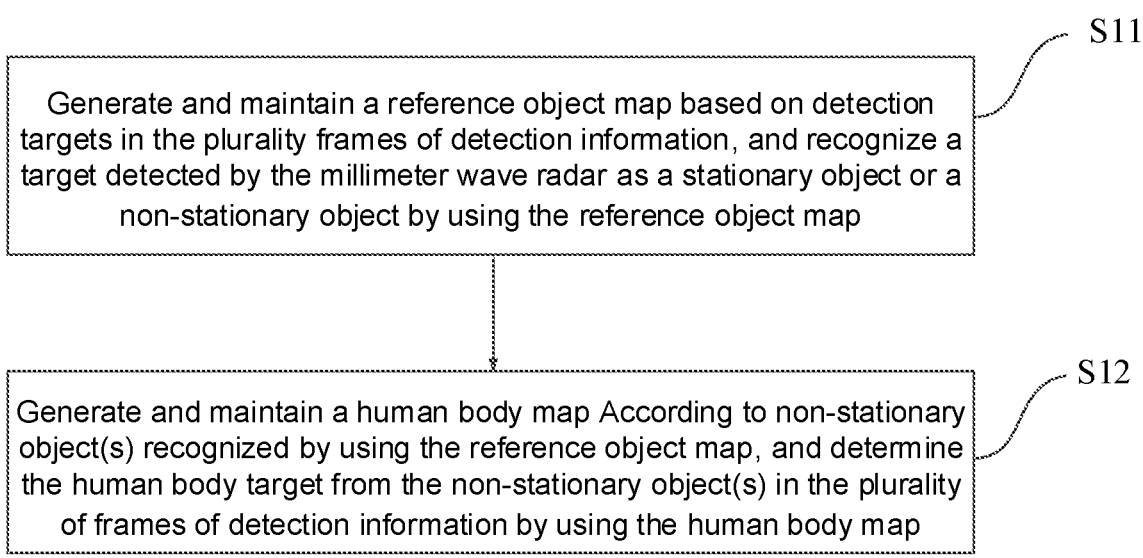
FIG. 2 is a flowchart of a method for recognizing a human body target by using a plurality of frames of detection information acquired by a millimeter wave radar within a preset time period, in accordance with some embodiments.
Figure 3:
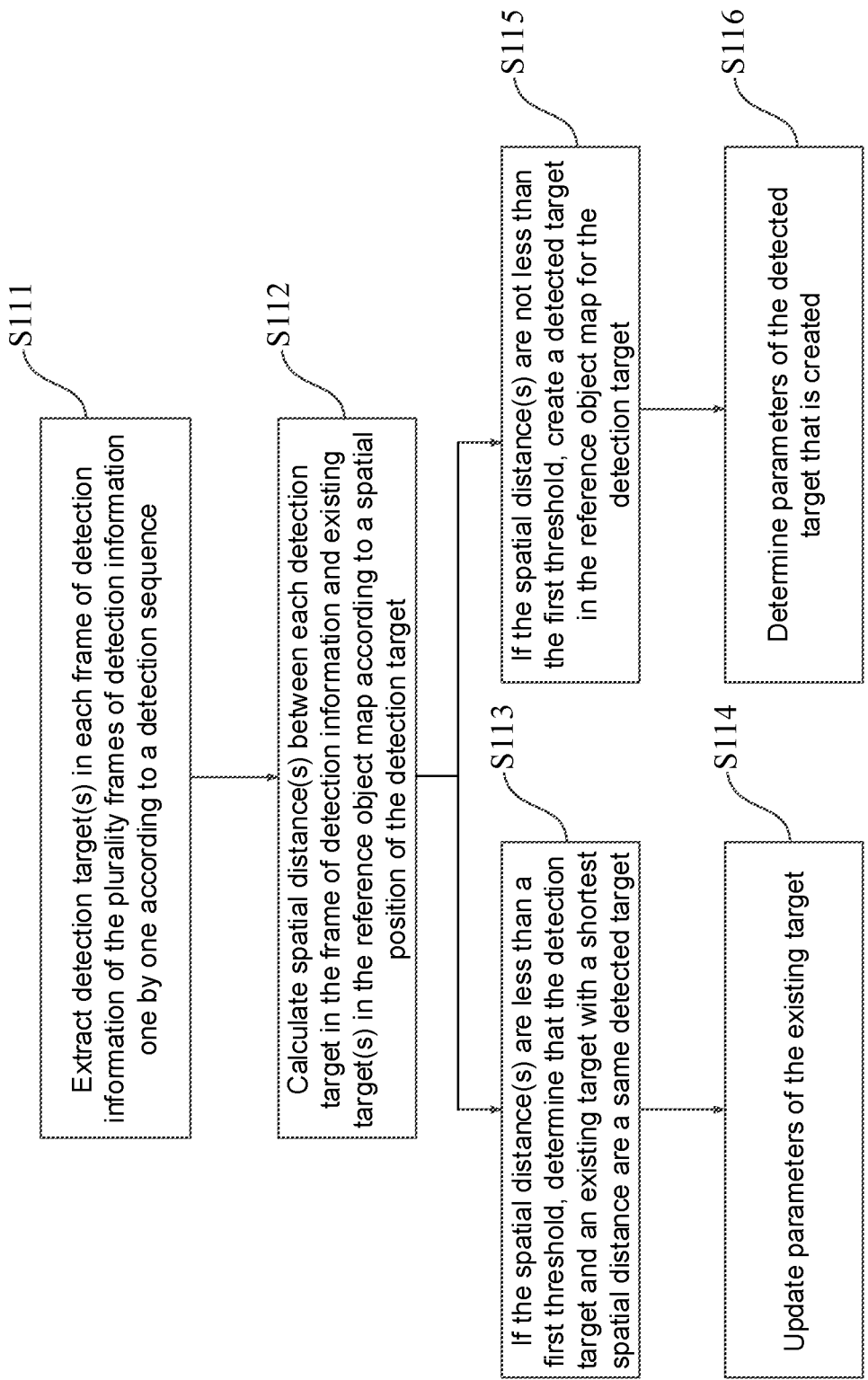
FIG. 3 is a flowchart of a method for maintaining a reference object map, in accordance with some embodiments.

In some embodiments, S1 in which the human body target is recognized by using the plurality of frames of detection information acquired by the millimeter wave radar within the preset time period includes steps 11 to 12 (S11 to S12) as shown in FIG. 2.

In S11, a reference object map is generated and maintained based on detection targets in the plurality of frames of detection information, and the target detected by the millimeter wave radar is recognized as a stationary object or a non-stationary object by using the reference object map.

For example, the reference object map is generated and maintained based on parameters of the detection targets in the plurality of frames of detection information.

It will be noted that, the reference object map in this step is generated based on detection target(s) in a first frame of detection information, and may be maintained based on detection targets in a plurality of subsequent frames of detection information. That is, before the first frame of the detection information is processed, the reference object map may not exist, and the reference object map is generated according to the detection target(s) obtained from the first frame of the detection information; and when a second frame of the detection information is processed, the detection target(s) in the first frame of the detection information become existing target(s), and the existing target(s) are compared with detection target(s) in the second frame of the detection information in distance to update the existing target(s) in the reference object map, so that the maintenance of the reference object map is realized. By analogy, as an increasing number of frames that are processed, new detection targets may be continuously added to the reference object map.

For example, parameters of the detection target include conventional parameters, such as spatial coordinates, a radial velocity, a signal-to-noise ratio and a noise.

For example, the parameters of the detection target further include self-defined parameters, such as a presence hot degree, a recent motion hot degree and a consecutive detection number. The presence hot degree is used to represent a frequency of a result that the detection target is detected in the plurality of frames of detection information. The higher the frequency, the larger the presence hot degree. The recent motion hot degree is used to represent a time interval between a last frame where a motion of the detection target is detected and the current frame. The smaller the time interval, the larger a value of the recent motion hot degree. The consecutive detection number is used to represent a number of times the detection target is continuously detected or continuously undetected. If the consecutive detection number is a positive value, it is indicated that the detection target is continuously detected; and if the consecutive detection number is a negative value, it is indicated that the detection target is continuously undetected.

In S12, a human body map is generated and maintained according to non-stationary object(s) recognized by using the reference object map, and the human body target is determined from the non-stationary object(s) in the plurality of frames of detection information by using the human body map.

It will be noted that, similar to the reference object map, the human body map is generated based on the first frame of detection information, and may be maintained based on the plurality of subsequent frames of detection information. That is, before first frame of the detection information is processed, the human body map may not exist, and the human body map is generated according to first frame of the detection information; and when the second frame of the detection information is processed, non-stationary object(s) in the first frame of detection information becomes existing target(s), and the existing target(s) are compared with non-stationary object(s) in the second frame of the detection information in distance to update the human body target in the human body map, so that the maintenance of the human body map is realized.

A difference between the reference object map and the human body map is that, the reference object map is a map in a three-dimensional space coordinate system, while the human body map is a two-dimensional map. The human body map may be a ground in an application scenario, alternatively, a plane to which the human body map pertains may be determined as required. Parameters of the human body target recorded in the human body map include: plane coordinates, a height (the height of the human), a recent motion hot degree, and a number of cumulative targets. The number of cumulative targets refers to a number of target points (i.e., body targets) detected by the radar.

In some embodiments, S11 in which the reference object map is maintained includes steps 111 to 116 (S111 to S116).

In S111, detection target(s) in each frame of detection information of the plurality of frames of detection information are extracted one by one according to a detection sequence.

In this step, data of detection targets are extracted frame by frame according to the number of the acquired frames. The data include parameters of the detection targets. By obtaining values of spatial coordinates and radial velocities of the detection targets, it may be determined whether a subsequent step needs to be performed on the detection targets. That is to say, rationality of these detection targets is evaluated to determine whether the detection targets are real objects.

For example, a basis for evaluating the rationality of a detection target is whether a distance between the detection target and the millimeter wave radar is within a preset detection range. The preset detection range is determined according to actual application needs.

In S112, spatial distance(s) between each detection target in the frame of detection information and existing target(s) in the reference object map are calculated according to a spatial position of the detection target.

In this step, the detection target in each frame of detection information is compared with the existing target(s) in the reference object map, and the spatial distance(s) between the detection target and the existing target(s) are calculated, so as to determine whether the detection target is an existing target in the reference object map.

It will be noted that a detection target detected by the millimeter wave radar may be represented as a point in the reference object map. A size of the point may be determined according to a resolution of the radar, or may be manually set according to the resolution. In this way, a representation of a single human body target in the reference object map will be a set of a plurality of detection targets.

In S113, if the spatial distance(s) are each less than a first threshold, it is determined that the detection target and an existing target are a same detected target.

In this step, since the detection target and the existing target are close enough to each other, the two detection targets are regarded as the same detected target.

In S114, parameters of the existing target are updated.

For example, a manner in which the parameters of the existing target are updated may include: updating spatial coordinates to an average value of spatial coordinates of the detection target and the spatial coordinates of the existing target (i.e., updating a coordinate position of the object in the map); updating a radial velocity, a signal-to-noise ratio and a noise to values of respective parameters of the detection target; increasing a presence hot degree within another preset range based on a gradient value (e.g., the another preset range is from 0 to 100, inclusive, and the gradient value is 1, in a case where the detection target and the existing target are determined to be the same target, the presence hot degree increases by 1 until the presence hot degree reaches a greatest value); updating a recent motion hot degree to a maximum value of the recent motion hot degree if the radial velocity exists (the recent motion hot degree being a range value; in a case where the detection target exists in the plurality of frames of detection information and moves, the value of the recent motion hot degree increases, while in a case where the detection target stops moving, the value of the recent motion hot degree decreases); and updating a consecutive detection number within yet another preset range based on a detection state of a preceding frame. Since the consecutive detection number may represent two states (a state of being consecutively detected and a state of being consecutively undetected), the update of the consecutive detection number is determined according to a value (the value of the existing target) for the preceding frame. In a case where the value for the preceding frame is positive (representing that an object is consecutively detected), a value of the consecutive detection number is added by 1; and in a case where the value for the preceding frame is negative (representing that the object is consecutively undetected), the value of the consecutive detection number is set to 1. The consecutive detection number is another range value (maximum of the range value being the number of the plurality of frames of detection information) which is generally from 1 to a maximum value (representing that the object is consecutively detected) or from −1 to a minimum value (representing that the object is consecutively undetected).

If the consecutive detection number is the maximum value, the presence hot degree of the detection target is set to a maximum value thereof, and the recent motion hot degree is set to 0.

For example, if the updated presence hot degree of the existing target is greater than a preset value, and the recent motion hot degree is 0, it indicates that the object corresponding to the existing target can be detected all the time, and never moves. In this case, the existing target is marked as a stationary object.

It will be noted that the preset value of the presence hot degree may be set manually.

For example, if the updated consecutive detection number of the existing target is equal to the preset minimum value, it indicates that the existing target once appeared in the reference object map, but has not been detected at a corresponding position for a long period of time. That is, the existing target moves. In this case, the existing target is marked as a non-stationary object.

For example, if it is determined that spatial distances between the detection target and a plurality of existing targets are all less than the first threshold in S1113, the detection target is merged with a nearest existing target, and values of parameters are updated; alternatively, the plurality of existing targets and the detection target are all merged into a single target, and then parameters of the target are updated.

In S115, if the spatial distance(s) are not less than the first threshold, a detected target is created in the reference object map for the detection target.

In this step, since spatial distances between the detection target and all existing targets are not less than the first threshold, it means that the detection target is a target newly emerging in the frame. In this case, the detected target is created in the reference object map for the detection target.

In S116, parameters of the detected target that is created are determined.

For example, a manner in which the parameters of the detected target are updated may include: setting values of spatial coordinates, a radial velocity, a signal-to-noise ratio and a noise to values of respective parameters of the detection target; setting a presence hot degree to 1; setting a recent motion hot degree to the maximum value thereof if the radial velocity exists, otherwise, setting the recent motion hot degree to 0; and setting a consecutive detection number to 1.

It will be noted that the first threshold in some of the above embodiments may be the resolution of the radar, or may be a value set manually, which is not limited in embodiments of the present disclosure.

Figure 4:
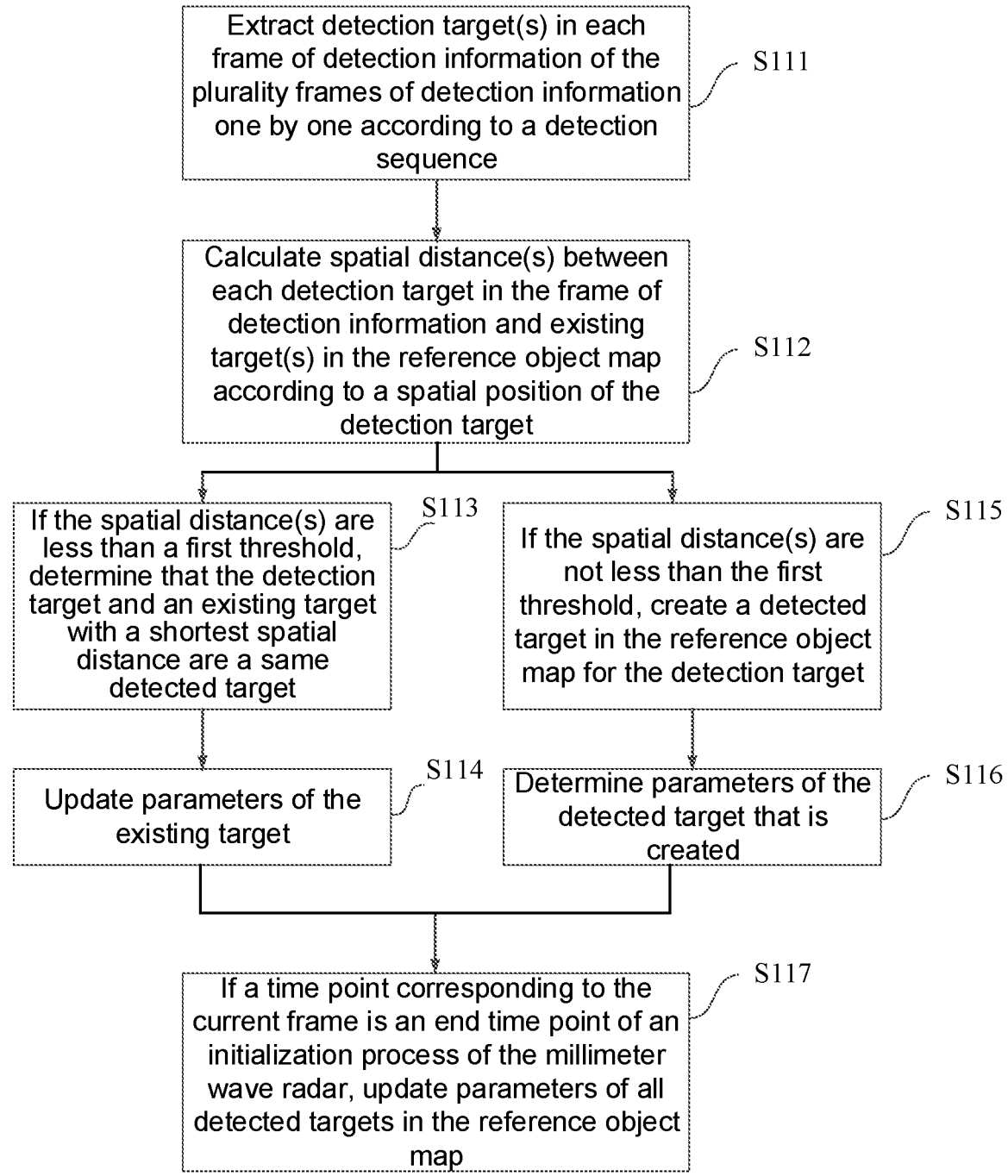
FIG. 4 is a flowchart of another method for maintaining a reference object map, in accordance with some embodiments.

In some embodiments, S11 in which the reference object map is maintained, as shown in FIG. 4, further includes step 117 (S117) in addition to S111 to S116 in the above embodiments.

In S117, if a time point corresponding to the current frame is an end time point of an initialization process of the millimeter wave radar, parameters of all detected targets in the reference object map are updated.

The initialization process in this step is a process that starts from an appearance of a first frame to be detected after the millimeter wave radar is activated and ends at a preset time, so as to generate the reference object map. That is, the initialization process is a process in which detection information is processed by the millimeter wave radar within an artificially set time length. A purpose of the initialization process is to quickly determine which detection target(s) within the detection range are stationary object(s) after the millimeter wave radar starts to work. Generally, it needs a long time to determine whether a detection target is a stationary object. However, in the initialization process in this step, a detection time may be forcibly reduced. If a movable object does not move during the initialization process, the object is still marked as a stationary object; and the object will be marked as a non-stationary object until moving in a subsequent detection process.

In S117, a manner in which the parameters of all detected targets in the reference object map are updated may include:
decreasing a presence hot degree of each detected target within a preset range progressively, where the preset range is from 0 to a preset value, and a process of decreasing progressively means decreasing according to a preset gradient until decreasing to 0; that is, the presence hot degree of the detected target is updated once after each frame of data is processed;
if a detected target corresponding to an existing target in the reference object map does not exists in the current frame (i.e., if there exists not a detection target to be merged with the existing target in the frame), setting a consecutive detection number to −1 if the consecutive detection number is a positive value, and decreasing the consecutive detection number by 1 if the consecutive detection number is a negative value;
marking a detected target with a presence hot degree being greater than the preset value and a recent motion hot degree being 0 as a stationary object; marking a detected target with a continuous detection number being equal to the preset minimum value (i.e., the detected target being continuously undetected in consecutive frames) as a non-stationary object; and deleting a detected target with a presence hot degree being 0 from the reference object map, i.e., deleting an object that is used to appear or sporadically appears.

Through the above embodiments, it will be concluded that, if an object is completely motionless and always detected (sometimes even if a target with insufficient signal-to-noise ratio does exist, the target is often missed by the radar), a presence hot degree will soon be able to reach the maximum value thereof, so the object will be determined as a stationary object; if an object is completely motionless, but intermittently detected due to an insufficient signal-to-noise ratio or occasional missed detection by the radar, a presence hot degree will also reach the maximum value thereof after a sufficient period of time, so the object will also be determined as a stationary object; an object, that may move but is basically stationary, will be re-marked as a stationary object after a long enough time or being continuously detected for a period of time after a motion thereof; if an object marked as a stationary object leaves the detection range, the object will not be marked as the stationary object in the reference object map soon, and a record of the object will be deleted from the reference object map after a long enough time, because a presence hot degree thereof returns to 0; and if an object marked as a stationary object is temporarily blocked by another object marked as a non-stationary object, the object will not be marked as the stationary object soon, however when the object is not blocked any more before an end of a long enough time (i.e., before a record of the stationary object is deleted), the object will be re-marked as the stationary object. Therefore, as long as the human moves a little within a time period corresponding to the maximum value of the presence hot degree, the human body will not be recognized as a stationary object, but will be marked as a non-stationary object.

In some embodiments, S12 in which the human body map is maintained includes steps 121 to 125 (S121 to S125).

In S121, detection target(s) in a single frame of the plurality of frames of detection information are acquired. In this step, the detection target(s) in the single frame of detection information are processed. This is because, if data of a plurality of existing frames of detection information are accumulated, the human body target at different positions is recorded in the plurality of frames in a case where the human moves, and the human body target at each position will be regarded as a suspected human body target when the human body map is generated. Consequently, the recognition is inaccurate.

In S122, if detection target(s) are marked as non-stationary object(s) in the reference object map, it is determined that the detection target(s) are each a human body target.

In this step, the detection target marked as the non-stationary object in the reference object map is determined as the human body target.

In addition, in some examples, it may be further determined whether the detection target marked as the non-stationary object is a hand. If the detection target is not recognized as the hand, the detection target is determined as the human body target.

In S123, it is determined whether a plane projection distance between the human body target and an existing target on the human body map is less than a second threshold. In this step, the human body target in the frame is projected into a plane where the human body map is located, and the distance between a plane projection of the human body target and the existing target on the plane is determined. If the plane projection distance is less than the second threshold, step 124 (S124) is executed; if the plane projection distance is not less than the second threshold, step 125 (S125) is executed.

It will be noted that the second threshold is generally determined according to an area occupied by a plane projection of a human on the human body map. For example, the second threshold distance is 0.5 m. In a case where the plane projection distance is less than the second threshold, it is determined that the human body target and the existing target are different parts of a same human. The existing target in the human body map refers to a target obtained by processing frames of detection information before the frame.

In S124, the human body target and the existing target are merged into a new human body target, and parameters of the new human body target in the human body map are updated.

If the distance between the human body target in a current frame and the existing target in the human body map is short enough, i.e., less than the second threshold, the two are merge into one target in this step, i.e., the new human body target.

In some examples, a specific manner in which the parameters of the new human body target are updated includes: updating plane coordinates to a weighted average (i.e., giving plane coordinates of the existing targets a weighting according to a cumulative target number, and giving the plane coordinates of the human body target a weighting according to 1); adding 1 to the cumulative target number; updating a height to a greater one of a current value of the existing target in the human body map and a height of the human body target; and updating a recent motion hot degree to a greater one of a current value of the human body target in the human body map and a recent motion hot degree of the existing target.

In S125, a new human body target corresponding to the human body target is created in the human body map, and parameters of the new human body target are determined according to parameters of the human body target.

If the distance between the human body target in the current frame and the existing target in the human body map is not short enough, i.e., not less than the second threshold, in this step, the new human body target is created in the human body map, and parameters of the new human body target are set.

In some examples, a specific manner in which the parameters of the new human body target are set includes: setting that plane coordinates, a height, and a recent motion hot degree are respective parameters of the human body target; and setting a cumulative target number as 1.

Figure 6:
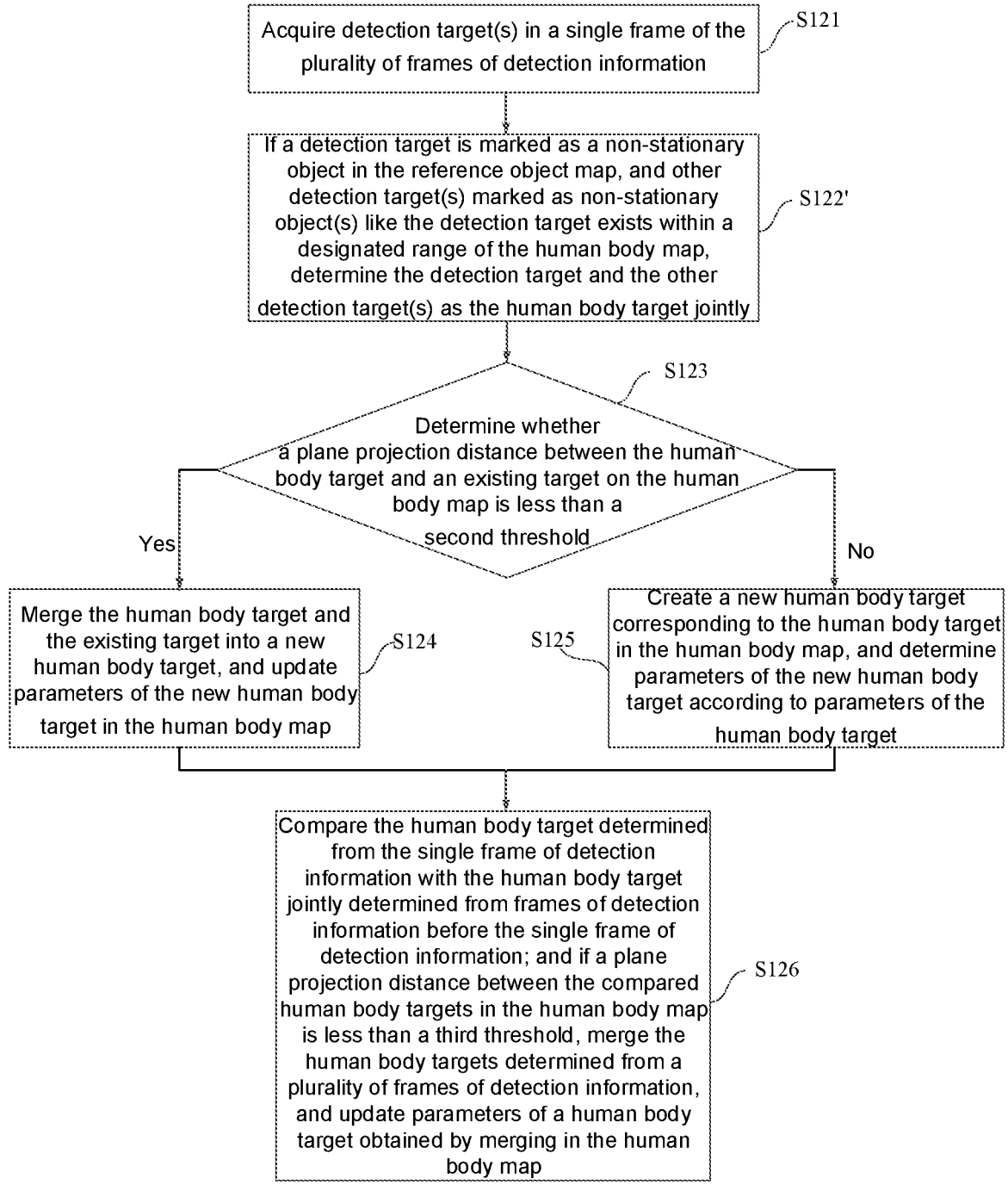
FIG. 6 is a flowchart of another method for maintaining a human body map, in accordance with some embodiments.

In some embodiments, as shown in FIG. 6, in S12 in which the human body map is maintained, S122 is replaced by step 122' (S122'), based on S121 to S125 in the above embodiments.

In S122', if a detection target is marked as a non-stationary object in the reference object map, and other detection target(s) marked as non-stationary object(s) like the detection target exist within a designated range of the human body map, the detection target and the other detection target(s) are determined as the human body target jointly. In this way, needs for one-by-one analysis of the human body targets are reduced, which improves processing efficiency.

It will be noted that the designated range may be a range occupied by a projection of the human in the human body map. Generally, during determining the human body target, there exist a plurality of detection targets within the designated range corresponding to the projection of the human body. In some examples, in a case where there exists only one detection target within the designated range, the detection target may not be determined as the human body target; alternatively, in a case where a number of detection targets within the designated range is less than a certain number, the detection targets may not be determined the human body target.

Figure 5:
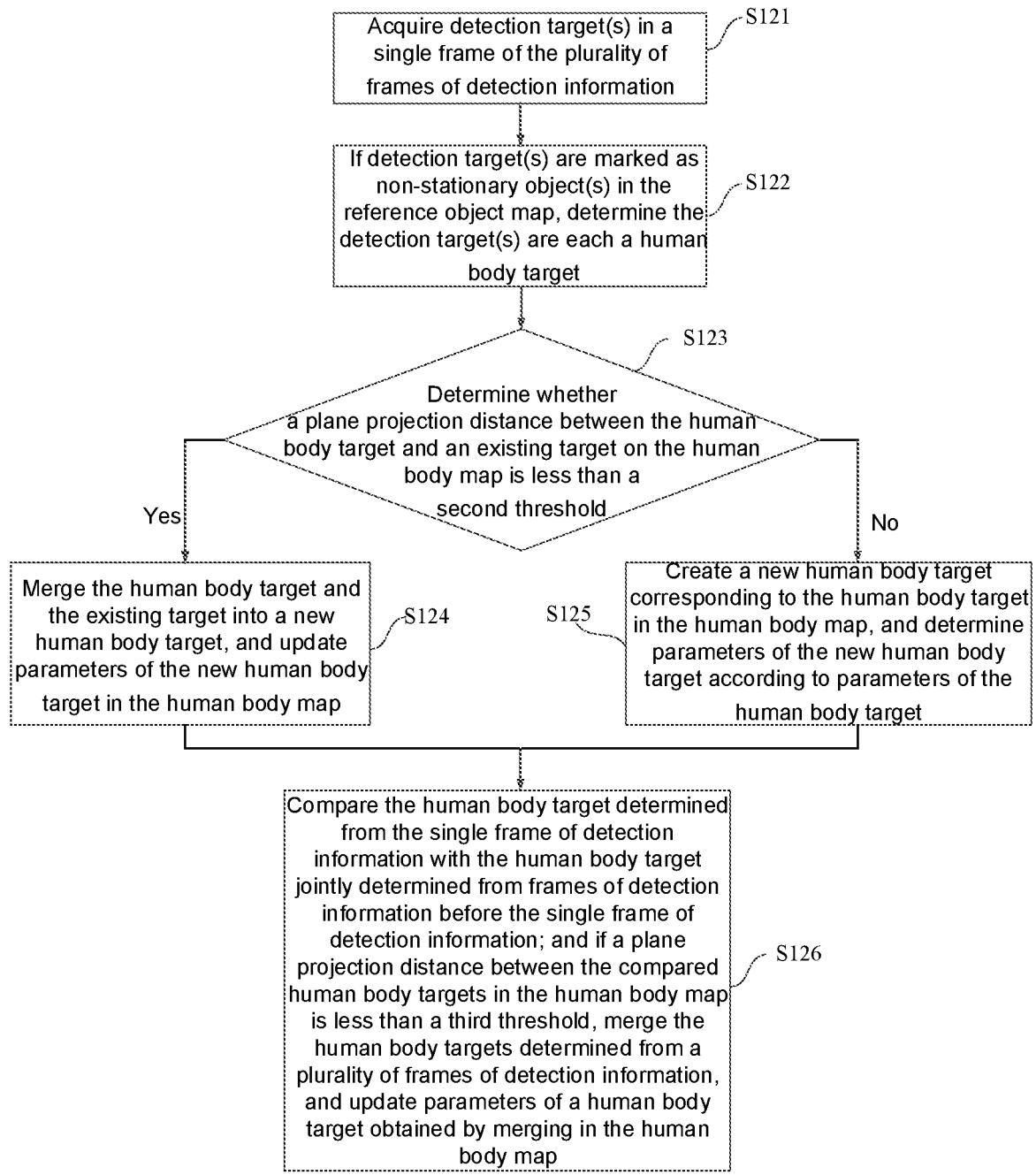
FIG. 5 is a flowchart of a method for maintaining a human body map, in accordance with some embodiments.

In some embodiments, as shown in FIGS. 5 and 6, S12 in which the human body map is maintained further includes step 126 (S126).

In S126, the human body target determined from the single frame of detection information is compared with the human body target jointly determined from frames of detection information before the single frame of detection information; and if a plane projection distance between the compared human body targets in the human body map is less than a third threshold, the human body targets determined from a plurality of detection information (including the single frame of detection information and the plurality of frames of detection information before the single frame of detection information) are merged, and parameters of a human body target obtained by merging in the human body map are updated.

In some embodiments described above, the human body map is updated and maintained according to detection targets in a single frame of detection information. After all detection targets in the single frame of detection information are traversed, human body targets determined from a plurality of preceding frames of detection information are traversed in units of frame. If a plane projection distance between human body targets on the human body map is less than the third threshold that is a self-defined distance, it is determined the human body targets determined from different frames are close enough to each other. Human body targets, which are determined close enough to each other, of a plurality of frames of detection information (including the current single frame of detection information and the plurality of preceding frames of detection information) are merged, and parameters of a merged human body target in the human body map are updated.

It will be noted that a manner of updating the parameters in S126 is the same as the manner of updating the parameters in S124, which will not be repeated here.

Through the steps in the above embodiments, i.e., based on the human body map generated and maintained according to non-stationary targets recognized in the reference object map and the plurality of frames of detection information, a specific human body target may be determined. Generally, a recent motion heat degree of the general human body target is not 0.

In some examples, based on a combination of height parameters of the human body targets and corresponding spatial coordinates, a height of the human body detected by the millimeter wave radar may further be determined, and the detected human may be further distinguished as an adult or a child according to the height.

Figure 7:
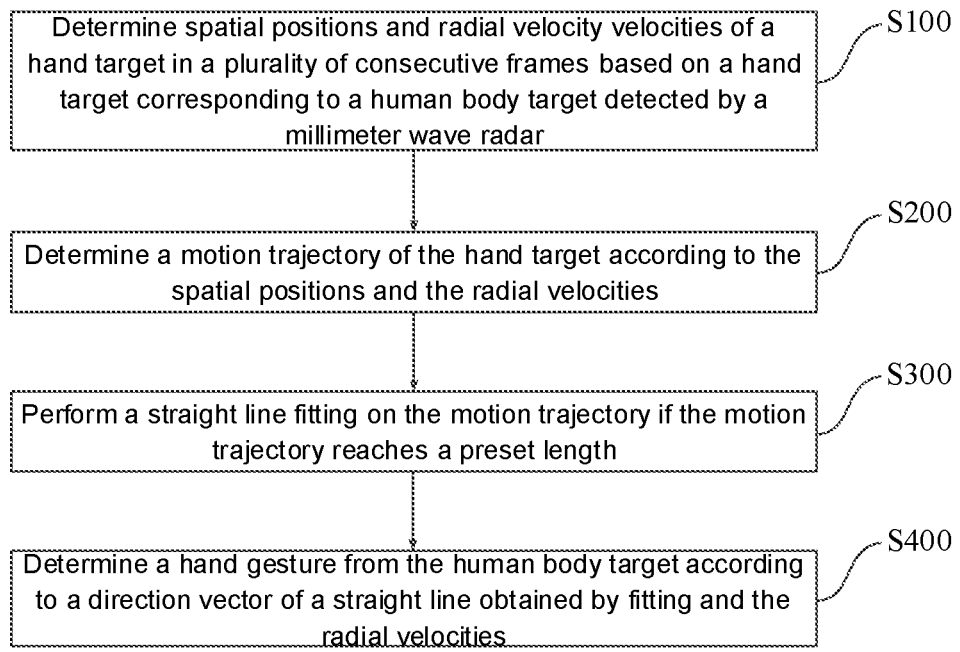
FIG. 7 is a flowchart of a method for recognizing a hand gesture from a human, in accordance with some embodiments.

Some embodiments of the present disclosure provide a method for recognizing a hand gesture from a human. The method is a method for quickly recognizing an action of a hand after a human body and the hand corresponding thereto are both recognized according to the above embodiments, so as to determine the hand gesture from the human. As shown in FIG. 7, the method includes steps 100 to 400 (S100 to S400).

In S100, spatial positions and radial velocities of a hand target in a plurality of consecutive frames are determined based on the hand target corresponding to a human body target detected by a millimeter wave radar.

Since the hand target has the corresponding human body target in this step, if a plurality of human body targets and a plurality of hand targets have been recognized, it may be possible to determine which human has made what hand gesture accurately, and thus provide an accurate result in response to the gesture.

It will be noted that the spatial positions and the radial velocities of the hand target in the plurality of consecutive frames are acquired in units of frame in this step.

In some examples, S1 in which the spatial positions and the radial velocities of the hand target in the plurality of consecutive frames are determined based on the hand target corresponding to the human body target detected by the millimeter wave radar includes steps 101 to 102 (S101 to S102).

In S101, a preset length of a motion trajectory is set.

It will be noted that the preset length is related to a number of different spatial positions where the hand target is detected, such that the motion trajectory of the hand target can be recognized. The number means that the hand target may be detected in each of the plurality of consecutive frames, and the number is equal to a number of the frames. However, in practical applications, there exists a case where no hand target is detected in a certain frame of a plurality of consecutive frames due to interference or other factors, or where space positions of hand targets in a plurality of consecutive frames are the same due to a slow motion of the hand target. In this case, it needs to acquire spatial positions and radial velocities of hand targets in more frames to form a motion trajectory, so as to make the motion trajectory have the preset length.

In addition, the setting of the preset length is further related to difficulty of the gesture to be recognized. That is, a simple gesture may be recognized by a short-length motion trajectory, while a complex gesture requires a long motion trajectory to be recognized.

In S102, the spatial positions and the radial velocities of the hand target in the plurality of consecutive frames are acquired according to the preset length.

In this step, a number of the plurality of consecutive frames is determined based on the preset length, and then the spatial positions and the radial velocities of the hand target are obtained from the plurality of consecutive frames.

In S200, a motion trajectory of the hand target is determined according to the spatial positions and the radial velocities.

In this step, a plurality of spatial points may be determined according to the spatial positions of the hand target, and a motion direction of the hand target may be determined according to the radial velocities corresponding to the spatial positions. These spatial points are connected by taking the motion direction as a reference to obtain the motion trajectory of the hand target.

In S300, if the motion trajectory reaches the preset length, a straight line fitting is performed on the motion trajectory.

In S200, the motion trajectory is determined based on the plurality of frames of detection information. A length of the motion trajectory is positively related to the number of the frames. However, in order to determine a gesture from the hand target, there exists no need to obtain the entire motion trajectory, but a portion of the motion trajectory is enough. Therefore, the preset length refers to a length of the motion trajectory of the hand target determined according to a specified number of consecutive frames of detection information.

In some examples, if the motion trajectory reaches the preset length, a spatial straight line fitting is performed on the motion trajectory.

For example, a least squares method may be used to perform the spatial straight line fitting on the motion trajectory.

In some other examples, if the motion trajectory reaches the preset length, the motion trajectory is projected into a preset plane, and the straight line fitting is performed in the preset plane.

It will be noted that after the spatial straight line fitting is performed, there exist generally two kinds of results. One kind of result is that, a linear correlation between the motion trajectory and a spatial straight line is high. That is, the motion trajectory may be fitted to the spatial straight line. In this case, a specific hand gesture from the human may be further determined according to the fitted spatial straight line. The other kind of result is that, the linear correlation between the motion trajectory and the spatial straight line is not high. That is, the motion trajectory cannot be fitted to a spatial straight line. In this case, the motion trajectory is projected into the preset plane, and the straight line fitting is performed in the preset plane. The preset plane is preset according to actual requirements. For example, the preset plane is a plane where a transceiver antenna of the millimeter wave radar is located.

If the motion trajectory still cannot be fitted to a straight line in the preset plane, no human gesture recognition is performed on the motion trajectory.

In S400, a hand gesture from the human body target is determined according to a direction vector of a straight line obtained by fitting and the radial velocities.

In this step, the recognized hand gesture from the human includes, but is not limited to a left and right sliding gesture, an up and down sliding gesture, and a front and rear sliding gesture that are made by the human towards the millimeter wave radar. The left and right sliding gesture and the up and down sliding gesture may be recognized by the direction vector of the space straight line. The front and rear sliding gesture may be recognized by the radial velocities of the hand target. By combining the direction vector of the straight line and the radial velocities, more slipping gestures may be recognized.

In some examples, if no hand gesture from the human body target is determined according to the direction vector of the straight line obtained by fitting and the radial velocities, the plurality of consecutive frames corresponding to the motion trajectory are updated. That is, data points constituting the motion trajectory are updated.

For example, updating the plurality of consecutive frames corresponding to the motion trajectory includes:

removing a first frame of detection information corresponding to the motion trajectory, and performing the straight line fitting on the remaining frames of detection information again;

determining a hand gesture from the human body target according to a direction vector of a straight line obtained by fitting and the radial velocities; and repeating the above steps until a portion of the motion trajectory corresponding to the remaining frames of detection information cannot reach the preset length any more.

In this step, on a premise that the length of the motion trajectory reaches the preset length, the specific hand gesture from the human may be determined by shortening the motion trajectory. In this way, an extra non-gesture action made by the hand before an action of the gesture may be excluded.

In some examples, after a single hand gesture from the human body target is determined, recognition for a hand gesture from the human body target is suspended for a preset time period.

This step is to prevent a hand movement, which happens after the human makes the single gesture and is a preparation for a next gesture, toward a next point from being recognized as a new gesture.

In the above embodiments, on a premise that the human body and the hand are both recognized to obtain the hand target corresponding to the human body target, the motion trajectory of the hand target is tracked, and then a specific gesture made by the human is quickly recognized.

Figure 8:
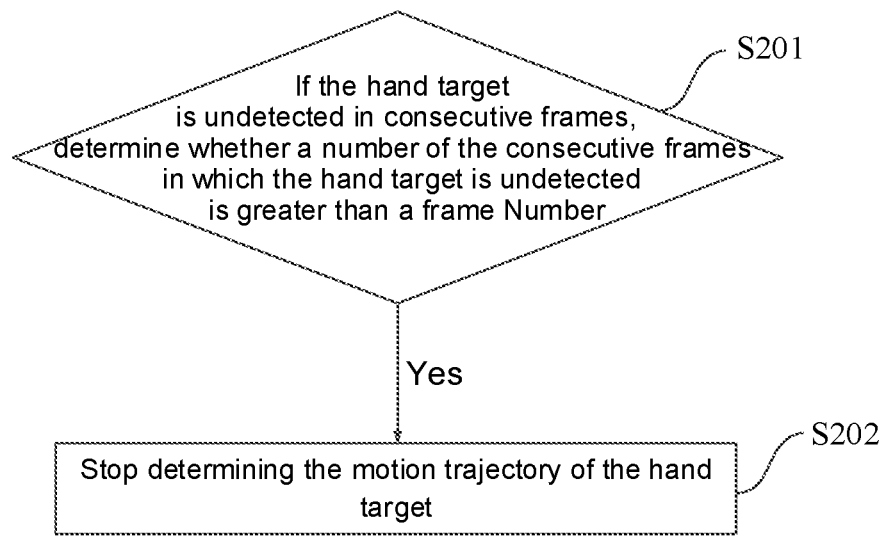
FIG. 8 is a flowchart of a method for determining a motion trajectory of a hand target according to spatial positions and radial velocities, in accordance with some embodiments.

In some embodiments, as shown in FIG. 8, S200 in which the motion trajectory of the hand target is determined according to the spatial positions and the radial velocities includes steps 201 (S201) and 202 (S202).

In S201, if the hand target is undetected in consecutive frames, it is determined whether a number of the consecutive frames in which the hand target is undetected is greater than a frame number.

In S202, if the number of consecutive frames in which the hand target is undetected is greater than the preset frame number, the determination for the motion trajectory of the hand target is stopped.

That is to say, a case where the hand target is undetected in some of the plurality of consecutive frames is allowed in the above steps. However, the number of consecutive frames in which the hand target is undetected needs to be limited. That is because, if the number of the consecutive frames is greater than the preset frame number, it may be regarded that the hand target has ended the gesture, alternatively, the gesture has been interrupted. In this case, the determination of the motion trajectory of the hand target will be stopped.

Figure 9:
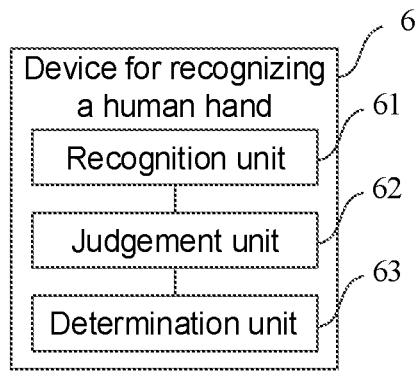
FIG. 9 is a structural diagram of a device for recognizing a human hand, in accordance with some embodiments.

Some embodiments of the present disclosure provide a device for recognizing a human hand. The device may recognize both a human body and a hand target corresponding to the human body within a detection range by using a millimeter wave radar accurately. The embodiments correspond to the embodiments of the method described above. For ease of reading, the embodiments will not repeat the details in the embodiments of the method one by one. However, it will be clear that the device in the embodiments may implement the entire content of the method embodiments correspondingly. As shown in FIG. 9, the device 6 includes: a recognition unit 61, a judgement unit 62 and a determination unit 63.

The recognition unit 61 is configured to recognize a human body target by using a plurality of frames of detection information acquired by the millimeter wave radar within a preset time period.

The judging unit 62 is configured to according to a current frame of detection information, determine whether a new detection target satisfying setting conditions exists within a preset range centering on the human body target determined by the recognition unit 61. The setting conditions includes: having a radial velocity.

The determination unit 63 is configured to, if the determining unit 62 determines that there exists the new detection target satisfying the setting conditions, determine the new detection target satisfying the setting conditions as the hand corresponding to the human body target; and if the determination unit 62 determines that there exists no new detection target satisfying the setting conditions, determine that the hand corresponding to the human body target does not exist in the current frame.

In some embodiments, the setting conditions further includes a signal-to-noise ratio being less than a signal-to-noise ratio of the human body target.

In some embodiments, the determination unit 63 is further configured to, if it is determined that there exist a plurality of new detection targets satisfying the setting conditions, determine a new detection target corresponding to the hand corresponding to the human body target according to a distance between the millimeter wave radar and each new detection target satisfying the setting conditions.

For example, the determination unit 63 is further configured to, within a detection range of the millimeter wave radar, determine a new detection target closest to the millimeter wave radar satisfying the setting conditions as the hand corresponding to the human body target.

Figure 10:
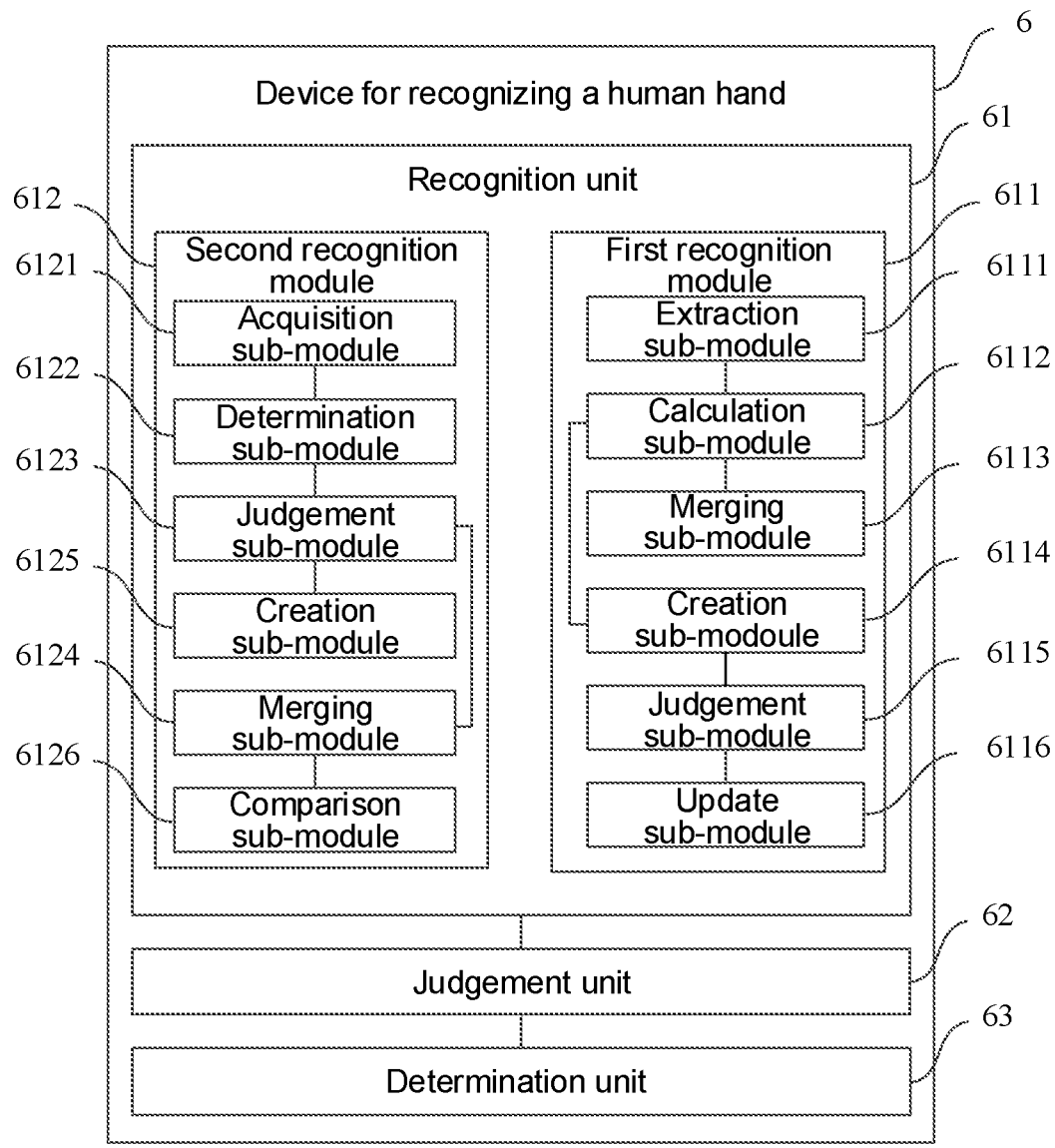
FIG. 10 is a structural diagram of another device for recognizing a human hand, in accordance with some embodiments.

In some embodiments, as shown in FIG. 10, the recognition unit 61 includes a first recognition module 611 and a second recognition module 612.

The first recognition module 611 is configured to generate and maintain a reference object map based on detection targets in the plurality of frames of detection information, and recognize whether the target detected by the millimeter wave radar is a stationary object or a non-stationary object by using the reference object map.

The second recognition module 612 is configured to generate and maintain a human body map according to non-stationary object(s) that are recognized according to the reference object map obtained by the first recognition module 611, and determine a human body target from the non-stationary object(s) in the plurality of frames of detection information by using the human body map.

In some examples, the first recognition module 611 is configured to generate and maintain the reference object map based on parameters of the detection targets in the plurality of frames of detection information, and recognize whether the target detected by the millimeter wave radar is a stationary object or a non-stationary object by using the reference object map.

For example, parameters of the detection target include at least one of: spatial coordinates, a radial velocity, a signal-to-noise ratio, a noise, a presence hot degree, a recent motion hot degree and a consecutive detection number.

The presence hot degree is used to represent a frequency of a result that the detection target is detected in the plurality of frames of detection information. The higher the frequency, the greater the presence hot degree.

The recent motion hot degree is used to represent a time interval between a last frame where a motion of the detection target is detected and the current frame. The smaller the time interval, the larger a value of the recent motion hot degree.

The consecutive detection number is used to represent a number of times the detection target is continuously detected or continuously undetected. If the consecutive detection number is a positive value, it is indicated that the detection target is continuously detected; and if the consecutive detection number is a negative value, it is indicated that the detection target is continuously undetected.

With continued reference to FIG. 10, the first recognition module 611 includes an extraction sub-module 6111, a calculation sub-module 6112, a merging sub-module 6113 and a creation sub-module 6114.

The extraction sub-module 6111 is configured to extract detection target(s) in each frame of detection information of the plurality of frames of detection information one by one according to a detection sequence.

The calculation sub-module 6112 is configured to calculate spatial distance(s) between each detection target in the frame of detection information and existing target(s) in the reference object map according to a spatial position of the detection target obtained by the extraction sub-module 6111.

The merging sub-module 6113 is configured to, if the spatial distance(s) obtained by the calculation sub-module 6112 are each less than a first threshold, determine that the detection target and an existing target with a shortest spatial distance are a same detected target. The merging sub-module 6113 is further configured to update parameters of the existing target after the detection target and the existing target are determined as the same detected target.

The creation sub-module 6114 is configured to, if the spatial distance(s) obtained by the calculation sub-module 6112 are not less than the first threshold, create a detected target in the reference object map for the detection target. The creation sub-module 6114 is further configured to determine parameters of the created detected target after being created in the reference map based on the detection target.

For example, a specific manner in which the parameters of the existing target are updated includes: updating spatial coordinates to an average value of spatial coordinates of the detection target and the spatial coordinates of the existing target; updating a radial velocity, a signal-to-noise ratio and a noise to values of respective parameters of the detection target; increasing a presence hot degree within another preset range based a gradient value; updating a recent motion hot degree to a maximum value of the recent motion hot degree if the radial velocity exists; updating a consecutive detection number within yet another preset range based on a detection state of a preceding frame; and if the consecutive detection number reaches a maximum value thereof, setting the presence hot degree to a maximum value of the presence hot degree, and setting the recent motion hot degree to 0.

If a presence hot degree is greater than a preset value, and a recent motion hot degree is 0, the existing target is marked as a stationary object. If the consecutive detection number of the existing target is equal to a preset minimum value, the existing target is marked as a non-stationary object.

For example, a specific manner in which the parameters of the created detected target are determined includes: setting values of spatial coordinates, a radial velocity, a signal-to-noise ratio and a noise to values of respective parameters of the detection target; setting a presence hot degree to 1; setting a recent motion hot degree to a maximum value thereof if the radial velocity exists, otherwise, setting the recent motion hot degree to 0; and setting a consecutive detection number to 1.

With continued reference to FIG. 10, the first recognition module 611 further includes a judgment sub-module 6115 and an update sub-module 6116.

The judgment sub-module 6115 is configured to determine whether a time point corresponding to the current frame is an end time point of an initialization process of the millimeter wave radar.

The update sub-module 6116 is configured to update parameters of all detected targets in the reference object map if the time point corresponding to the current frame is the end time point of the initialization process of the millimeter wave radar.

For example, a specific manner in which the parameters of all detected targets in the reference object map are updated includes: decreasing a presence hot degree of each detected target within a preset range progressively, where the preset range is from 0 to a preset value, and a process of decreasing progressively means decreasing according to a preset gradient until decreasing to 0. That is, a presence hot degree of the detected target is updated once after each frame of data is processed.

If a detected target corresponding to an existing target in the reference object map does not exists in the current frame, setting a consecutive detection number to −1 if the consecutive detection number is a positive value, and decreasing the consecutive detection number by 1 if the consecutive detection number is a negative value.

The update sub-module 6116 is further configured to: mark a detected target with a presence hot degree being greater than the preset value and a recent motion hot degree being 0 as a stationary object; mark a detected target with a continuous detection number being equal to the preset minimum value as a non-stationary object; and delete a detected target with a presence hot degree being 0 from the reference object map.

With continued reference to FIG. 10, the second recognition module 612 includes: an acquisition sub-module 6121, a determination sub-module 6122, a judgment sub-module 6123, a merging sub-module 6124 and a creation sub-module 6125.

The acquisition sub-module 6121 is configured to acquire detection target(s) in a single frame of the plurality of frames of detection information.

The determination sub-module 6122 is configured to determine a detection target obtained by the acquisition sub-module 6121 as a human body target if the detection target obtained is marked as a non-stationary object in the reference object map.

The determination sub-module 6123 is configured to determine whether a plane projection distance between the human body target determined by the determination sub-module 6122 and an existing target on the human body map is less than a first threshold value.

The merging sub-module 6124 is configured to, if the determination sub-module 6123 determines that the plane projection distance is less than the threshold value, merge the human body target and the existing target into a new human body target and update parameters of the new human body target in the human body map.

The creation sub-module 6125 is configured to, if the determination sub-module 6123 determines that the plane projection distance is not less than the threshold value, create a new human body target corresponding to the human body target in the human body map and determine parameters of the new human body target according to parameters of the human body target.

With continued reference to FIG. 10, the second recognition module 612 further includes: a comparison sub-module 6126. The comparison sub-module 6126 is configured to compare the human body target determined from the single frame of detection information with a human body target determined jointly from frames of detection information before the frame of detection information.

In some examples, the merging sub-module 6124 is further configured to, if the comparison sub-module 6126 determines that the plane projection distance between human body targets on the human body map is less than a third threshold, merge the human body targets determined from the plurality of compared frames of detection information, and update parameters of a human body target obtained by merging in the human body map.

In some examples, the determination sub-module 6122 is further configured to determine a height of a human body target by using spatial coordinates of the human body target and the human body map.

In some examples, the determination sub-module 6122 is further configured to, if a detection target is marked as a non-stationary object in the reference object map, and there exist other detection target(s) marked as non-stationary object(s) like the detection target within a specified range of the human body map, determine the detection target and the other detection target(s) jointly as a human body target.

Figure 11:
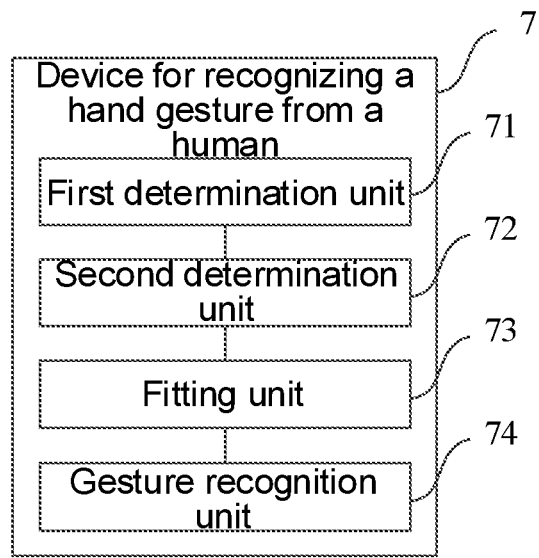
FIG. 11 is a structural diagram of a device for recognizing a hand gesture from a human, in accordance with some embodiments.

Some embodiments of the present disclosure provide a device for recognizing a hand gesture from a human. The device may quickly recognize the gesture made by a human on a basis of the human body and a hand corresponding to the human body that are both recognized by a millimeter wave radar. The embodiments correspond to the embodiments of the method described above. For ease of reading, the embodiments will not repeat the details in the embodiments of the method one by one. However, it will be clear that, the device in the embodiments may correspondingly implement the entire content of the embodiments of the method. As shown in FIG. 11, the device 7 includes a first determination unit 71, a second determination unit 72, a fitting unit 73 and a gesture recognition unit 74.

The first determination unit 71 is configured to determine spatial positions and radial velocities of a hand target in a plurality of consecutive frames by using the hand target corresponding to a human body target detected by a millimeter wave radar.

The second determination unit 72 is configured to determine a motion trajectory of the hand target according to the spatial positions and the radial velocities determined by the first determination unit 71.

The fitting unit 73 is configured to perform a straight line fitting on the motion trajectory if the motion trajectory determined by the second determination unit 72 reaches a preset length.

The gesture recognition unit 74 is configured to determine the hand gesture from the human body target according to a direction vector of a straight line obtained by the fitting unit 73 and the radial velocities.

In some examples, the gesture recognition unit 74 is further configured to suspend recognition of the hand gesture corresponding to the human body target for a preset time period, after a single hand gesture corresponding to the human body target is determined.

In some examples, the fitting unit 73 is configured to perform a spatial straight line fitting on the motion trajectory if the motion trajectory determined by the second determination unit 72 reaches the preset length.

Alternatively, the fitting unit 73 is configured to project the motion trajectory into a preset plane and perform a straight line fitting in the preset plane, if the motion trajectory determined by the second determination unit 72 reaches the preset length.

With continued reference to FIG. 11, the device further includes a setting unit 75. The setting unit 75 is configured to set the preset length of the motion trajectory. The preset length is related to a number of different spatial positions where the hand target is detected.

On this basis, the first determination unit 71 is further configured to acquire the spatial positions and the radial velocities of the hand target in the plurality of consecutive frames according to the preset length set by the setting unit 75.

With continued reference to FIG. 11, the device 7 further includes an update unit 76. The update unit 76 is configured to update the plurality of consecutive frames corresponding to the motion trajectory, if the gesture recognition unit 74 fails to determine a hand gesture from the human body target according to the direction vector and the radial velocities.

Figure 12:
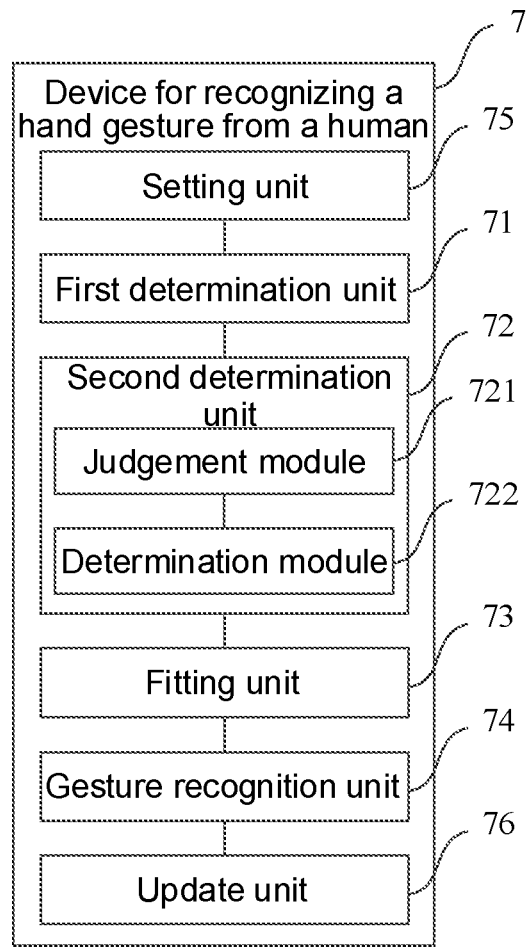
FIG. 12 is a structural diagram of another device for recognizing a hand gesture from a human, in accordance with some embodiments.

With continued reference to FIG. 12, the second determination unit 72 includes: a judgement module 721 and a determination module 722.

The judgment module 721 is configured to determine whether a number of consecutive frames in which a hand target is undetected is greater than a preset number, if the hand target is continuously undetected in the consecutive frames.

The determination module 722 is configured to stop determining the motion trajectory of the hand target, if the determination module 722 determines that the number of the consecutive frames is greater than the preset.

Some embodiments of the present disclosure further provide a processor for running a program. When the program runs, one or more steps in the method for recognizing the human hand as described in any one of the above embodiments are executed, or one or more steps in the method for recognizing the hand gesture from the human as described in any one of the above embodiments are executed.

For example, the processor may be a central processing unit (CPU), or other general-purpose processor, a digital signal processor (DSP), an application specific integrated circuit (ASIC), a field programmable gate array (FPGA) or other programmable logic device, a discrete gate or a transistor logic device, a discrete hardware component, etc. The general-purpose processor may be a microprocessor. Alternatively, the processor may be any conventional processor.

Figure 13:
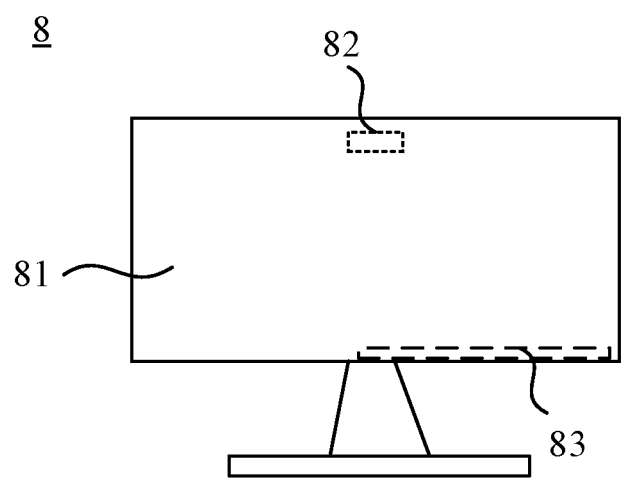
FIG. 13 is a structural diagram of a display apparatus, in accordance with some embodiments.

Some embodiments of the present disclosure provide a display apparatus 8. As shown in FIG. 13, the display apparatus 8 includes a display panel 81, a millimeter wave radar 82 integrated in the display panel 81, the millimeter wave radar 82 being configured to acquire a plurality of frames of detection information within a preset time period, and the processor 83 described in any one of the above embodiments.

In some examples, the millimeter wave radar appears as a flat-shaped object, which is a complete system actually including transceiver antennas, a radio frequency (RF) front end, a data processor, a power supply, an output interface, etc. and is formed discretely or in an integrated chip manner.

In some examples, the transceiver antennas are arranged in a two-dimensional array on a flat plate.

In some examples, the transceiver antennas are disposed vertically. That is, a normal direction of the transceiver antennas is disposed in a horizontal plane. In this way, a reasonable detection range may be obtained, and calculation is easily performed.

For example, the millimeter wave radar is a frequency modulated continuous wave (FMCW) millimeter wave radar. The FMCW millimeter wave radar may be an IWR6843 radar chip and an ancillary antenna that are from Texas Instruments (TI), with a frequency band of 60 GHz to 64 GHz, three transmitting antennas and four receiving antennas, which may output three-dimensional coordinates and a radial velocity of a detected target, and includes a data processor that can perform data calculation and processing.

Some embodiments of the present disclosure provide a computer program. When computer program instructions of the computer program are executed on a computer, the computer program instructions cause the computer to perform one or more steps in the method for recognizing the human hand as described in any one of the above embodiments, or perform one or more steps in the method for recognizing the hand gesture from the human as described in any one of the above embodiments. Some embodiments of the present disclosure provide a computer program product. The computer program product includes computer program instructions. When run on a computer, the computer program instructions cause the computer to perform one or more steps in the method for recognizing the human hand as described in any one of the above embodiments, or perform one or more steps in the method for recognizing the hand gesture from the human as described in any one of the above embodiments.

Some embodiments of the present disclosure provide a computer-readable storage medium that has stored computer program instructions. When run on a computer, the computer program instructions cause the computer to perform one or more steps in the method for recognizing the human hand as described in any one of the above embodiments, or perform one or more steps in the method for recognizing the hand gesture from the human as described in any one of the above embodiments.

In some examples, the computer-readable storage media includes one of a permanent computer-readable medium, a non-permanent computer-readable medium, a removable media and a non-removable media, which may implement information storage in any method or by any technology. The information may be computer-readable instructions, data structures, program modules or other data.

For example, the computer storage medium includes, but not limited to, a phase change memory (PRAM), a static random access memory (SRAM), a dynamic random access memory (DRAM) or other types of random access memory (RAM), a read-only memory (ROM), electrically erasable programmable read-only memory (EEPROM), a flash memory or other memory technologies, a compact disc read-only memory (CD-ROM), a digital versatile disc (DVD) or other optical storage, magnetic tape cartridges, tape disk storage or other magnetic storage devices or any other non-transmission media, which may be used to store information that may be accessed by a computing device. As defined herein, the computer-readable storage media does not include a transitory computer-readable medium, such as a modulated data signal and a carrier wave.

Beneficial effects of the processor, the computer program product, the computer program and the computer-readable storage medium are the same as the beneficial effects of the method for recognizing the human hand and the method for recognizing the hand gesture from the human, which will not be detailed here.

In the above embodiments, the description of each embodiment has emphasis thereof. For a part that is not described in detail in a certain embodiment, reference may be made to a relevant description of other embodiments.

An algorithm and display provided herein are not inherently related to any particular computer, virtual system, or other device. Various general-purpose systems may also be used in conjunction with the teachings herein. A structure required to construct such a system is apparent from the above description. In addition, embodiments of the present disclosure are not directed to any particular programming language. It will be understood that various programming languages may be used to implement embodiments of the present disclosure, and the description of specific languages above is for a purpose of describing embodiments of the present disclosure in a best mode.

As will be understood for one skilled in the art, the embodiments of the present disclosure may be provided as a method, a system, or a computer program product. Therefore, embodiments of the present disclosure may take a form of an entirely hardware embodiment, an entirely software embodiment, or an embodiment combining software and hardware. Moreover, embodiments of the present disclosure may take a form of a computer program product embodied on one or more computer-readable storage media (including but not limited to disk storages, CD-ROMs, optical storages, etc.) having included computer-usable program codes therein.

Embodiments of the present disclosure is described with reference to flowcharts and/or block diagrams of methods, devices (systems) and the computer program product in accordance with some embodiments of the present disclosure. It will be understood that each process and/or each block in the flowcharts and/or the block diagrams and combinations of processes and/or blocks in the flowcharts and/or the block diagrams may be implemented by the computer program instructions. These computer program instructions may be provided to a processor of a genera-purpose computer, a special purpose computer, an embedded processor or other programmable data processing device to generate a machine. In this way, a device used to realize functions defined by one or more process in the flowcharts and/or one or more blocks in the block diagrams is generated by using the processor of the computer or other programmable data processing device to execute instructions.

These computer program instructions may also be stored in a computer-readable memory capable of directing a computer or other programmable data processing device to function in a particular manner, such that the instructions stored in the computer-readable memory result in a manufacture including a command device. The command device realizes the functions defined by one or more process in the flowcharts and/or one or more blocks in the block diagrams.

These computer program instructions may also be loaded on a computer or other programmable data processing device, so that a series of steps are performed on the computer or the other programmable device, which realizes a processing implemented by the computer. Therefore, the instructions implemented on the computer or the other programmable device provide steps for realizing the functions defined by one or more process in the flowcharts and/or one or more blocks in the block diagrams.

In a typical configuration, a computing device includes one or more processors (CPUs), an input/output interface, a network interface and a memory.

The memory may include a memory in a form of a non-persistent memory, a random access memory (RAM) and/or a non-volatile memory in a computer readable media. For example, the memory is a read only memory (ROM) or a flash RAM. The memory is an example of a computer-readable medium.

As will be understood for one skilled in the art, embodiments of the present disclosure may be provided as a method, a system or a computer program product. Therefore, embodiments of the present disclosure may take a form of an entirely hardware embodiment, an entirely software embodiment, or an embodiment combining software and hardware. Moreover, embodiments of the present disclosure may take a form of a computer program product embodied on one or more computer-readable storage media (including but not limited to disk storages, CD-ROMs, optical storages, etc.) having included computer-usable program codes therein.

The above are only specific embodiments of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A method for recognizing a human hand, comprising:
recognizing a human body target by using a plurality of frames of detection information acquired by a millimeter wave radar within a preset time period;
determining whether a new detection target satisfying setting conditions exists within a preset range centering on the human body target, according to a current frame of detection information, the setting conditions including: having a radial velocity;
if so, determining the new detection target satisfying the setting conditions as a hand corresponding to the human body target; and
if not, determining that the hand corresponding to the human body target does not exist in the current frame.

2. The method according to claim 1, wherein recognizing the human body target by using the plurality of frames of detection information acquired by the millimeter wave radar within the preset time period, includes:
generating and maintaining a reference object map based on detection targets in the plurality frames of detection information;
recognizing whether each target detected by the millimeter wave radar is a stationary object or a non-stationary object by using the reference object map;
generating and maintaining a human body map based on at least one non-stationary object recognized by using the reference object map; and
determining the human body target from the at least one non-stationary object in the plurality frames of detection information by using the human body map.

3. The method according to claim 2, wherein generating and maintaining the reference object map based on the detection targets in the plurality frames of detection information, includes:
generating and maintaining the reference object map based on parameters of the detection targets in the plurality frames of detection information, the parameters of each detection target including: at least one of spatial coordinates, a radial velocity, a signal-to-noise ratio, a noise, a presence hot degree, a recent motion hot degree or a consecutive detection number.

4. The method according to claim 3, wherein the presence hot degree is used to represent a frequency of a result that each detection target is detected in the plurality of frames of detection information; the higher the frequency, the larger the presence hot degree; and/or
the recent motion hot degree is used to represent a time interval between a last frame in which a motion of the detection target is detected and the current frame; the smaller the time interval, the larger a value of the recent motion hot degree; and/or
the consecutive detection number is used to represent a number of times the detection target is continuously detected or continuously undetected; if the consecutive detection number is a positive value, it is indicated that the detection target is continuously detected; and if the consecutive detection number is a negative value, it is indicated that the detection target is continuously undetected.

5. The method according to claim 3, wherein maintaining the reference object map, includes:
extracting at least one detection target in each frame of detection information of the plurality frames of detection information one by one according to a detection sequence;
calculating at least one spatial distance between each detection target in the frame of detection information and at least one existing target in the reference object map according to a spatial position of the detection target;
if the at least one spatial distance is less than a first threshold, determining that the detection target and an existing target with a shortest spatial distance from the detection target are a same detected target, or determining that the detection target and the least one existing target in the reference object map are the same detected target; and
if the at least one spatial distance is not less than the first threshold, creating a detected target in the reference object map for the detection target.

6. The method according to claim 5, wherein after determining that the detection target and the existing target with the shortest spatial distance from the detection target are the same detected target, maintaining the reference object map, further includes:
updating parameters of the existing target, including:
updating spatial coordinates to an average value of spatial coordinates of the detection target and the spatial coordinates of the existing target;
updating a radial velocity, a signal-to-noise ratio and a noise to values of respective parameters of the detection target;
increasing a presence hot degree within another preset range based a gradient value;
updating a recent motion hot degree to a maximum value of the recent motion hot degree if the radial velocity exists;
updating a consecutive detection number within yet another preset range based on a detection state of a preceding frame;
if the consecutive detection number reaches a maximum value thereof, setting the presence hot degree to a maximum value thereof, and setting the recent motion hot degree to 0.

7. The method according to claim 6, wherein after updating the parameters of the existing target, maintaining the reference object map, further includes:
if the presence hot degree of the existing target is greater than a preset value and the recent motion hot degree is 0, marking the existing target as a stationary object; and/or
if the consecutive detection number of the existing target is equal to a preset minimum value, marking the existing target as a non-stationary object.

8. The method according to claim 5, wherein after creating the detected target in the reference object map for the detection target, maintaining the reference object map, further includes:
determine parameters of the detected target that is created, including:
setting values of spatial coordinates, a radial velocity, a signal-to-noise ratio and a noise to values of respective parameters of the detection target;
setting a presence hot degree of the detected target to 1;
setting a recent motion hot degree to a maximum value thereof if the radial velocity exists, otherwise setting the recent motion hot degree to 0; and
setting a consecutive detection number to 1.

9. The method according to claim 5, wherein maintaining the reference object map, further includes:
if a time point corresponding to the current frame is an end time point of an initialization process of the millimeter wave radar, updating parameters of all detected targets in the reference object map, including:
decreasing a presence hot degree of each detected target within a preset range linearly;
if a detected target corresponding to an existing target in the reference object map does not exist in the current frame, setting a consecutive detection number of the existing target to −1 if the consecutive detection number of the existing target is a positive value, and decreasing the consecutive detection number of the existing target by 1 if the consecutive detection number of the existing target is a negative value; and
marking a detected target with a presence hot degree being greater than a preset value and a recent motion hot degree being 0 as a stationary object;
marking a detected target with a continuous detection number reaching a preset minimum value as a non-stationary object; and
deleting a detected target with a presence hot degree being 0 from the reference object map; wherein the initialization process is a process that starts from an appearance of a first frame to be detected after the millimeter wave radar is activated and ends at a preset time, so as to generate the reference object map.

10. The method according to claim 2, wherein maintaining the human body map, includes:
acquiring each detection target in a single frame of detection information of the plurality of frames of detection information; and
if a detection target is marked as a non-stationary object in the reference object map, determining the detection target as the human body target; or
acquiring each detection target in a single frame of detection information of the plurality of frames of detection information; and
if a detection target is marked as a non-stationary object in the reference object map, and one or more other detection targets marked as one or more non-stationary objects like the detection target exist within a designated range of the human body map, determining the detection target and the one or more other detection targets jointly as the human body target.

11. The method according to claim 10, wherein after determining the human body target, maintaining the human body map further includes:
determining whether a distance between a plane projection of the human body target on the human body map and an existing target in the human body map is less than a second threshold;
if so,
merging the human body target with the existing target into a new human body target, and
determining parameters of the new human body target in the human body map; and
if not,
creating the new human body target corresponding to the human body target in the human body map, and determining parameters of the new human body target according to parameters of the human body target.

12. The method according to claim 10, wherein maintaining the human body map, further includes:
comparing the human body target determined from the single frame of detection information with a human body target jointly determined from frames of detection information before the single frame of detection information; and
if a distance between plane projections of the compared human body targets on the human body map is less than a third threshold,
merging the compared human body targets, and
updating parameters of a human body target obtained by merging in the human body map.

13. The method according to claim 1, further comprising:
if a plurality of new detection targets satisfy the setting conditions exist, determining a new detection target of the plurality of new detection targets corresponding to the hand corresponding to the human body target according to a distance between the millimeter wave radar and each new detection target satisfying the setting conditions.

14. The method according to claim 1, wherein the setting conditions further includes: a signal-to-noise ratio less than a signal-to-noise ratio of the human body target.

15. A method for recognizing a hand gesture from a human, comprising:
determining spatial positions and radial velocities of a hand target in a plurality of consecutive frames based on the hand target corresponding to a human body target detected by a millimeter wave radar;
determining a motion trajectory of the hand target according to the spatial positions and the radial velocities;
performing a straight line fitting on the motion trajectory if the motion trajectory reaches a preset length; and
determining the human gesture corresponding to the human body target according to a direction vector of a straight line obtained by fitting and the radial velocities,
wherein
determining the motion trajectory of the hand target according to the spatial positions and the radial velocities, includes:
if the hand target is undetected in consecutive frames, determining whether a number of the consecutive frames in which the hand target is undetected is greater than a preset frame number; and
if the number of the consecutive frames in which the hand target is undetected is greater than the preset frame number, stopping determining the motion trajectory of the hand target.

16. The method according to claim 15, wherein performing the straight line fitting, includes:
performing a spatial straight line fitting; and/or
projecting the motion trajectory into a preset plane, and performing the straight line fitting in the preset plane.

17. A processor, using for executing a program, wherein when the program is executed, any one of following methods is implemented:
the method for recognizing the human hand according to claim 1, and
a method for recognizing a hand gesture from the human, including:
determining spatial positions and radial velocities of a hand target in a plurality of consecutive frames based on the hand target corresponding to the human body target detected by the millimeter wave radar;

determining a motion trajectory of the hand target according to the spatial positions and the radial velocities;

performing a straight line fitting on the motion trajectory if the motion trajectory reaches a preset length; and determining the human gesture corresponding to the human body target according to a direction vector of a straight line obtained by fitting and the radial velocities.

18. A display apparatus, comprising:

a display panel;

a millimeter wave radar integrated in the display panel, the millimeter wave radar being configured to acquiring a plurality of frames of detection information within a preset time period; and the processor according to claim 17.

19. A non-transitory computer-readable storage medium having stored computer program instructions, wherein when executed by a processor, the computer program instructions cause the processor to perform any one of following methods:

the method for recognizing a human hand according to claim 1, and a method for recognizing a hand gesture from a human, including:

determining spatial positions and radial velocities of a hand target in a plurality of consecutive frames based on the hand target corresponding to the human body target detected by the millimeter wave radar;

determining a motion trajectory of the hand target according to the spatial positions and the radial velocities;

performing a straight line fitting on the motion trajectory if the motion trajectory reaches a preset length; and determining the human gesture corresponding to the human body target according to a direction vector of a straight line obtained by fitting and the radial velocities.

* * * * *